(12) United States Patent
Agarwal et al.

(10) Patent No.: US 9,049,613 B2
(45) Date of Patent: Jun. 2, 2015

(54) RADIO OR NETWORK EVALUATION FOR SELECTION BASED ON MEASUREMENTS USING APPLICATION LAYER PROTOCOLS AT A MOBILE DEVICE

(71) Applicant: Seven Networks, Inc., San Carlos, CA (US)

(72) Inventors: Vivek Agarwal, Foster City, CA (US); Chaitali Sengupta, Richardson, TX (US); Yuan Kang Lee, San Diego, CA (US)

(73) Assignee: Seven Networks, Inc., San Carlos, CA (US)

( * ) Notice: Subject to any disclaimer, the term of this patent is extended or adjusted under 35 U.S.C. 154(b) by 0 days.

(21) Appl. No.: 14/195,758

(22) Filed: Mar. 3, 2014

(65) Prior Publication Data

US 2014/0362712 A1 Dec. 11, 2014

Related U.S. Application Data

(60) Provisional application No. 61/832,079, filed on Jun. 6, 2013.

(51) Int. Cl.
*H04L 12/26* (2006.01)
*H04W 28/02* (2009.01)
*H04W 24/00* (2009.01)
*H04W 48/18* (2009.01)

(52) U.S. Cl.
CPC .......... *H04W 28/0236* (2013.01); *H04W 24/00* (2013.01); *H04W 48/18* (2013.01)

(58) Field of Classification Search
None
See application file for complete search history.

(56) References Cited

U.S. PATENT DOCUMENTS

| 6,965,948 | B1 * | 11/2005 | Eneborg et al. | 709/250 |
| 7,318,111 | B2 * | 1/2008 | Zhao | 709/250 |
| 7,433,929 | B2 * | 10/2008 | Guilford et al. | 709/217 |
| 7,817,964 | B2 * | 10/2010 | Patel et al. | 455/67.11 |
| 7,848,756 | B2 * | 12/2010 | Nader et al. | 455/436 |
| 8,000,276 | B2 * | 8/2011 | Scherzer et al. | 370/310.1 |
| 8,089,911 | B2 * | 1/2012 | Huang et al. | 370/312 |
| 8,379,551 | B2 * | 2/2013 | Wietfeldt et al. | 370/310 |
| 8,400,914 | B2 * | 3/2013 | Sachs et al. | 370/230 |

(Continued)

FOREIGN PATENT DOCUMENTS

| JP | 2013030919 A | 2/2013 |
| KR | 20130027868 A | 3/2013 |
| KR | 20130056677 A | 5/2013 |

OTHER PUBLICATIONS

IPRP for Application No. PCT/US2014/041429 dated Oct. 1, 2014.

*Primary Examiner* — Michael J Moore, Jr.
(74) *Attorney, Agent, or Firm* — NKK Patent Law, PLLC

(57) ABSTRACT

In one embodiment, a method comprises measuring a set of parameters for each of the available networks using an application layer protocol (e.g., HTTP). The method further comprises determining an overall quality level for each of the available networks based on the parameters, and choosing the network based on the overall quality level. In some embodiments, the set of parameters are measured by communicating with each of a plurality of predetermined servers within a respective network. Among other advantages, embodiments disclosed herein enable a quantified approach to user experience estimation and application-level Quality of Experience (QoE) measurements, which can serve as bases for selection of radios for the applications.

26 Claims, 16 Drawing Sheets

(56) References Cited

U.S. PATENT DOCUMENTS

| | | | |
|---|---|---|---|
| 8,526,375 B2* | 9/2013 | Ishizu et al. | 370/329 |
| 8,811,187 B2* | 8/2014 | Macias et al. | 370/241 |
| 8,849,276 B2* | 9/2014 | Guilford et al. | 455/432.1 |
| 2004/0066759 A1* | 4/2004 | Molteni et al. | 370/329 |
| 2007/0255797 A1* | 11/2007 | Dunn et al. | 709/217 |
| 2008/0244095 A1 | 10/2008 | Vos et al. | |
| 2010/0099393 A1* | 4/2010 | Brisebois et al. | 455/418 |
| 2012/0184277 A1* | 7/2012 | Hiltunen et al. | 455/437 |
| 2013/0007853 A1 | 1/2013 | Gupta et al. | |
| 2013/0065562 A1* | 3/2013 | Singh | 455/414.1 |
| 2014/0003404 A1* | 1/2014 | Gillett et al. | 370/338 |
| 2014/0071895 A1* | 3/2014 | Bane et al. | 370/328 |
| 2014/0162648 A1* | 6/2014 | Cui et al. | 455/435.3 |
| 2014/0220967 A1* | 8/2014 | Pankajakshan et al. | 455/432.1 |
| 2014/0362713 A1* | 12/2014 | Agarwal et al. | 370/252 |
| 2015/0036672 A1* | 2/2015 | Kim et al. | 370/338 |

* cited by examiner

| Cellular | PL < 50% | PL ≥ 50% | PL = 100% |
|---|---|---|---|
| RTT < 150 (ms) | 6 | 2 | 1 |
| 150 ≤ RTT < 250 | 5 | 2 | 1 |
| 250 ≤ RTT < 750 | 4 | 2 | 1 |
| 750 ≤ RTT | 3 | 2 | 1 |

*FIG. 5A*

| WLAN | PL < 50% | PL ≥ 50% | PL = 100% |
|---|---|---|---|
| RTT < 150 (ms) | 6 | 2 | 1 |
| 150 ≤ RTT < 350 | 5 | 2 | 1 |
| 350 ≤ RTT < 500 | 4 | 2 | 1 |
| 500 ≤ RTT | 3 | 2 | 1 |

*FIG. 5B*

RADIO OR NETWORK EVALUATION FOR
SELECTION BASED ON MEASUREMENTS
USING APPLICATION LAYER PROTOCOLS
AT A MOBILE DEVICE

CROSS-REFERENCE TO RELATED
APPLICATIONS

This application is entitled to the benefit of and/or the right of priority to U.S. Provisional Patent Application No. 61/832, 079, entitled "RADIO OR NETWORK EVALUATION FOR SELECTION BASED ON MEASUREMENTS USING APPLICATION LAYER PROTOCOLS AT A MOBILE DEVICE," filed on Jun. 6, 2013; and U.S. Provisional Application No. 61/833,630, entitled "QUALITY OF EXPERIENCE ENHANCEMENT FOR WIRELESS NETWORKS BASED ON RECEIVED SIGNAL STRENGTH AT A MOBILE DEVICE" filed Jun. 11, 2013; all of which are hereby incorporated by reference in their entireties. This application is therefore entitled to an effective filing date of Jun. 6, 2013.

This application is related to U.S. patent application Ser. No. 14/195,795. entitled "QUALITY OF EXPERIENCE ENHANCEMENT FOR WIRELESS NETWORKS BASED ON RECEIVED SIGNAL STRENGTH AT A MOBILE DEVICE," filed on Mar. 3, 2014, which claims the benefit of U.S. Provisional Application No. 61/833,630, entitled "QUALITY OF EXPERIENCE ENHANCEMENT FOR WIRELESS NETWORKS BASED ON RECEIVED SIGNAL STRENGTH AT A MOBILE DEVICE," filed Jun. 11, 2013, the contents of which are all incorporated by reference herein in their entireties.

This application is also related to U.S. patent application Ser. No. 13/784,544, entitled "MOBILE DEVICE WHICH HANDS OVER CONNECTIVITY FROM ONE NETWORK CONNECTION TO ANOTHER NETWORK CONNECTION WITHOUT INTERRUPTION IN APPLICATION DATA FLOW AND METHODS THEREFOR," filed on Mar. 4, 2013; U.S. patent application Ser. No. 13/784,486 entitled "PROVIDING DATA. TO A MOBILE APPLICATION ACCESSIBLE AT A MOBILE DEVICE VIA DIFFERENT NETWORK CONNECTIONS WITHOUT INTERRUPTION," filed on Mar. 4, 2013; both of which claim the benefit of U.S. Provisional Patent Application No. 61/606,053, entitled "MOBILE BASED SEAMLESS CONNECTIVITY," which was filed on Mar. 2, 2012; the contents of which are all incorporated by reference herein in their entireties.

BACKGROUND

With the ever increasing availability of mobile applications, there has been an explosive growth in data traffic from the applications' constant polling and data signaling with other servers or devices on the network, leading to network congestion. On the other hand, advancements in semiconductor technologies have made it possible to include multiple network modules on a single device. For example, it is not uncommon nowadays for a mobile device such as a smart phone to have one or more cellular network modules capable of performing data exchange (e.g., 3G, HSPA+, LTE, etc.) as well as other data network modules (e.g., WiFi, Bluetooth, NFC, etc.).

As WiFi network services become more ubiquitous and accessible, in particular, in both indoor and outdoor environments, integration and utilization of WiFi networks by mobile devices are becoming a mechanism through which network operators can alleviate their data traffic load. In some instances, LAN based networks such as WiFi networks and services can also provide a mechanism to enhance mobile device performance when used in conjunction with cellular networks and connections.

BRIEF DESCRIPTION OF THE DRAWINGS

The present embodiments are illustrated by way of example and are not intended to be limited by the figures of the accompanying drawings. In the drawings:

FIGS. 5A and 5B respectively depict two network specific quality tables which can be adapted in the network evaluation and selection engine in gauging network quality levels;

The same reference numbers and any acronyms identify elements or acts with the same or similar structure or functionality throughout the drawings and specification for ease of understanding and convenience.

DETAILED DESCRIPTION

Figure 1A:
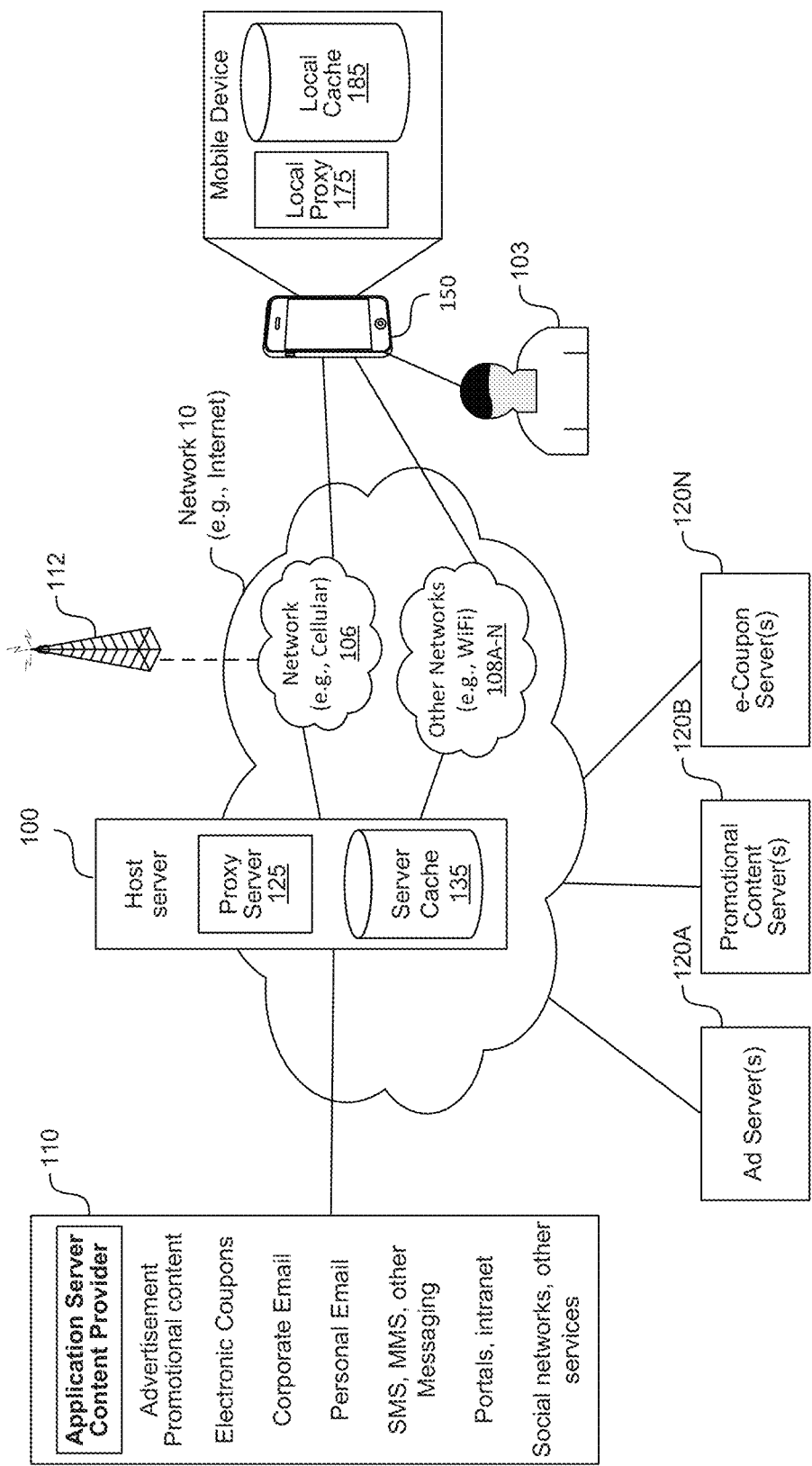
FIG. 1A depicts an example diagram of an environment in which the present embodiments may be implemented, the environment including a mobile device which can access different network connections in communicating with remote entities.

Devices typically have multiple radios to access different networks (e.g., 3G, 4G, LTE, Wi-Fi, Bluetooth, and/or NFC) for data traffic. As such, in one embodiment, quantification of various network signal metrics can be used to select an optimal network such that quality of experience (QoE) can be enhanced for a given user and/or for a given device. Among others, one of the problems solved by the present disclosure is to measure this QoE from Application level ("App").

In some embodiments, the QoE can be determined on an application-by-application basis on each mobile device or for each user. The disclosed techniques facilitate measurements, computations, determinations, assessments, evaluations, quantifications or qualification of QoE and/or other suitable measurement of user experience to select the best network or the best radio/protocol (3G, 4G, LTE, Wi-Fi, Bluetooth, NFC) to use for the traffic (e.g., IP traffic) for a given mobile application.

In one embodiment, the QoE is measured from the mobile device side (e.g., a local proxy 175 or 275 of the mobile device), and the present techniques can be implemented or measured at the application level on the mobile device. In general, the techniques disclosed herein require no or little need for system level changes or measurements. One advantage includes reduction of the time it takes to generate or compute a bad or non-representative QoE outcome.

Additional benefits of the presently disclosed technique include, for example, facilitating decisions in selecting an optimal or a best radio for use (e.g., 3G/4G or Wi-Fi) or an optimal, best network (e.g., WiFi networks offered among different access points (APs)), facilitating operator's ability to use the measured metrics for Wi-Fi off loading, and/or facilitating operator's ability to use the measured metrics for retrieving QoE numbers of their mobile networks at different time/locations.

In some embodiments, the techniques disclosed herein further include for network evaluation and selection, and more specifically for selecting a network from a number of available networks at a mobile device for communication by a mobile application.

In one embodiment, a method comprises measuring a set of parameters for each of the available networks using an application layer protocol (e.g., HTTP). Examples of parameters can include, for a given network, the Round-Trip Time (RTT) and/or Packet Loss (PL) parameters or other parameters for the applicable servers. Then, a quality level or an overall quality level for the given networks based on the parameters can be computed or assessed. More specifically, in some embodiments, a statistical parameter of the RTT and/or the PL, for example, a median RTT and an average PL (%) number for each server based on the readings can be calculated. It is noted that median RTT and average PL are example metrics which can be used to assess the quality of experience (QoE) or user experience and the like with an application at a mobile device for a specific network or for a given radio; other suitable mathematical and/or statistical quantifiers can be computed or determined for evaluating quality of experience (QoE) or other types of user experience. Then, with the median RTT and/or the average PL for one or more servers, the quality determination module can assign a specific quality level to the servers, for example, based on a quality table which is specific to the given network or radio.

The method further comprises determining an overall quality level for each of the available networks based on the parameters, and choosing the network based on the overall quality level. In some embodiments, the set of parameters are measured by communicating with each of a plurality of predetermined servers within a respective network. The application layer protocol is able to establish communication with the servers without requiring an administrative privilege of the mobile device, which may be typically required for other applications that utilize lower-level measurements, thereby reducing the time and effort necessary for deployment. Among other advantages, embodiments disclosed herein enable a quantified approach to measuring network signals so as to optimize user experience and a quantified approach to application-level Quality of Experience (QoE) measurements, which can serve as bases for selection of radios for the applications.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

FIG. 1A depicts an example diagram of an environment in which the present embodiments may be implemented. The depicted environment includes a mobile device 150 which can access different network connections (e.g., network 106 and other networks 108A-N) in communicating with remote entities such as a remote application server or content provider 110 and/or advertisement servers 120A-N. The networks 106 (e.g., a cellular network) and 108A-N (e.g., a WLAN/WiFi network) can form and/or connect to a larger network 10 (e.g., the Internet), which is connected to (either directly or indirectly) the servers 110 and 120A-N for communication.

In general, the network 10 over which the client devices 150, and/or application server 110 communicate, may include a cellular network (e.g., network 106), a telephonic network, a broadband network (e.g., networks 108A-N), an open network such as the Internet, or a private network such as an intranet and/or the extranet, or any combination thereof.

In general, signals received or detected indicating user activity at client devices 150 through one or more of the above input mechanism, or others, can be used in the disclosed technique(s) in obtaining context awareness at the client device 150. Context awareness at client devices 150 generally includes, by way of example but not limitation, client device 150 operation or state acknowledgement, management, user activity/behavior/interaction awareness, detection, sensing, tracking, and/or application (e.g., mobile applications) type, behavior, activity, operating state, etc. In some embodiments, contextual data can be collected for use in managing, evaluating, and/or selecting multi-network situations at a mobile device 150.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cellular network provider 112 and/or Internet service providers) of the network 106 and/or network 108A-N (e.g., by the host server and/or devices 150). In addition to application context awareness as determined from the client 150 side, the application context awareness may also be received from or obtained/queried from the respective application/service providers 110 (by the host 100 and/or client devices 150).

The mobile device 150 can include, in some embodiments, a local proxy 175, and optionally, a local cache 185 that provides network optimization and resource conservation functionalities. The local proxy 175 can be a part of a proxy and cache system distributed between a host server 100 and device 150 which facilitates network traffic management, network resource optimization and conservation, content caching, and/or mobile application performance optimization between the device 150 and an application server or content provider 110, or other servers such as an ad server 120A, promotional content server 120B, or an e-coupon server 120C. An example of such proxy system distributed among the host server 100 and the device 150 (or "a distributed proxy and/or caching system") is described in U.S. patent application Ser. No. 13/178,598, titled "CONTEXT AWARE TRAFFIC MANAGEMENT FOR RESOURCE CONSERVATION IN A WIRELESS NETWORK," filed Jul. 8, 2011, which is assigned to the present assignee and incorporated herein by reference in its entirety. As further described in the following sections, the proxy system (e.g., local proxy 175) can further implement network evaluation and selection techniques disclosed herein.

In general, the proxy and cache system distributed between the host server 100 and device 150 facilitates network traffic management between the device 150 and an application server or content provider 110, or other servers such as an ad server 120A, promotional content server 120B, or an e-coupon server 120C for resource conservation and content caching. The proxy system distributed among the host server 100 and the device 150 can further track alarms, timers or other triggers implemented by applications on a device and resources used by such alarms, timers, or other triggers to determine associations using which the proxy system can manipulate the alarms, timers or other triggers to occur at an optimal time to reduce resource usage.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In context aware traffic management and optimization for resource conservation in a network (e.g., cellular or other wireless networks), characteristics of user activity/behavior and/or application behavior at mobile device (e.g., any wireless device) 150 can be tracked by the local proxy 175, over the network 10 to a proxy server component 125 in the host server 100 of the distributed proxy and caching system. The local proxy 175 can also identify and retrieve mobile device properties, including one or more of, battery level, network that the device is registered on, radio state, or whether the mobile device is being used (e.g., interacted with by a user). In some instances, the local proxy 175 can delay, expedite (prefetch), and/or modify data prior to transmission when appropriate. Further, the local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In general, the distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 (e.g., in conjunction with proxy server) can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the networks 106 and/or 108A-N can be reduced, as the networks are now used less often and the network traffic can be synchronized among individual applications.

Contextual information obtained from client/mobile devices 150, networks 106/108, applications (e.g., mobile applications), application server/provider 110, or any combination of the above, can be used to manage the traffic in the system to satisfy data needs of the client devices 150 (e.g., to satisfy application or any other request including HTTP request).

In one embodiment, the traffic is managed to satisfy data requests made in response to explicit or non-explicit user 103 requests and/or device/application maintenance tasks. As disclosed in the related U.S. patent application Ser. No. 13/784,486, the traffic can be managed such that network consumption (e.g., use of the cellular network) is conserved for effective and efficient bandwidth utilization through handovers or effective utilization of multiple networks at a mobile device 150. In addition, the device 150 side resources (e.g., including but not limited to battery power consumption, radio use, processor/memory use) can be optimized with a general philosophy for resource conservation while still optimizing performance and user experience through the disclosed management of providing data to mobile applications utilizing selection among multiple radios and/or utilizing different network connections and managing handover situations from one network to another network.

Figure 1B:
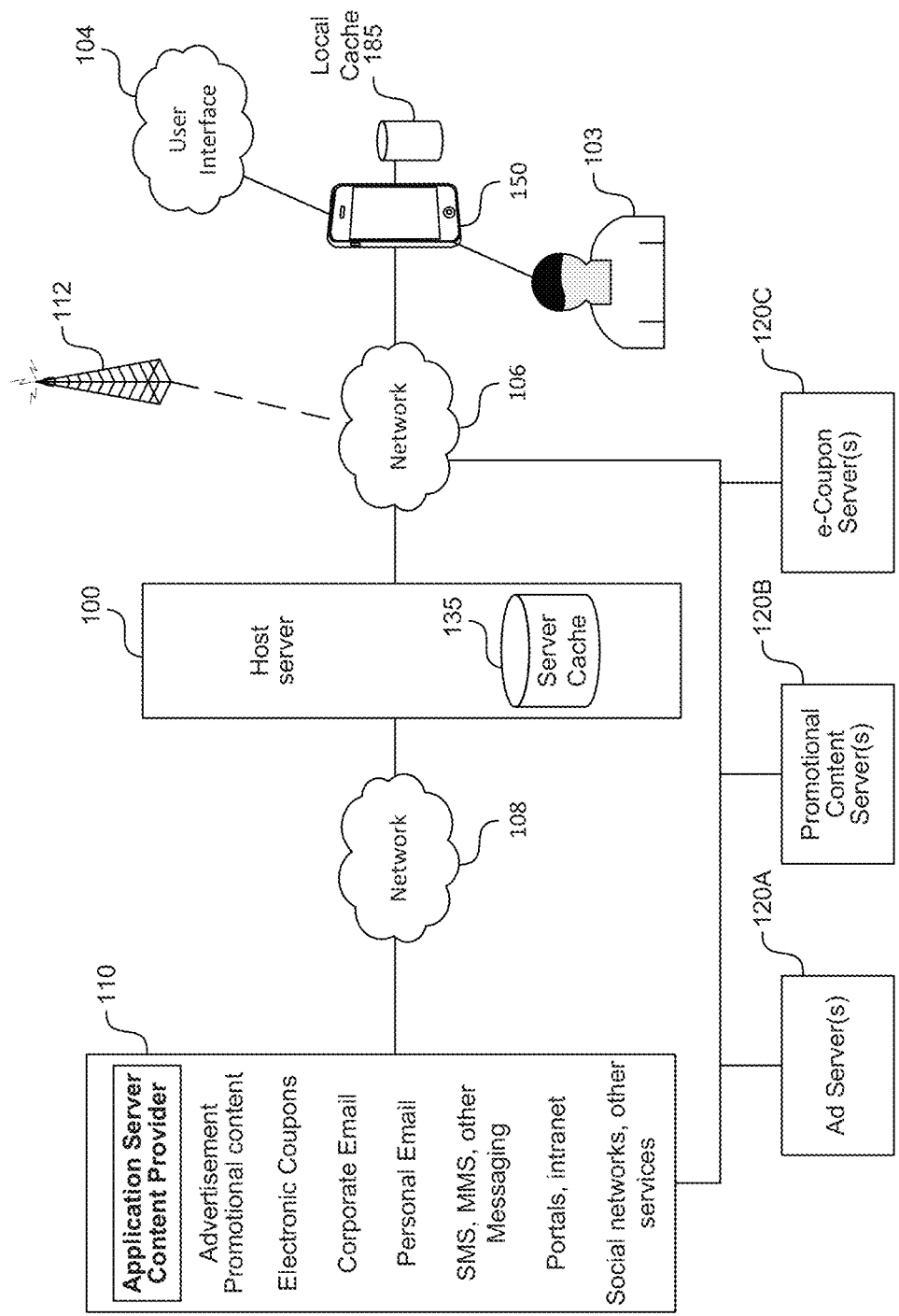
FIG. 1B depicts an example diagram of a system where a host server facilitates management of traffic, content caching, and/or resource conservation between mobile devices (e.g., wireless devices), an application server or content provider, or other servers such as an ad server, promotional content server, or an e-coupon server in a wireless network (or broadband network) for resource conservation.

FIG. 1B illustrates an example diagram of a system where a host server 100 facilitates management of traffic, content caching, and/or resource conservation between mobile devices (e.g., wireless devices 150), and an application server or content provider 110, or other servers such as an ad server 120A, promotional content server 120B, or an e-coupon server 120C in a wireless network (or broadband network) for resource conservation. The host server can further interact with mobile or client devices 150 for getting reports and/or updates on resource usage, savings, and the like.

The mobile device 150 can be any system and/or device, and/or any combination of devices/systems that is able to establish a connection, including wired, wireless, cellular connections with another device, a server and/or other systems such as host server 100 and/or application server/content provider 110. Client devices 150 will typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

For example, the client devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, a handheld tablet (e.g., an iPad or any other tablet), a hand held console, a hand held gaming device or console, any Super-Phone such as the iPhone, and/or any other portable, mobile, hand held devices, or fixed wireless interface such as a M2M device, etc. In one embodiment, the client devices 150, host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation is performed using a distributed system between the host server 100 and client device 150. The distributed system can include proxy server and cache components on the server side 100 and on the device/client side, for example, as shown by the server cache 135 on the server 100 side and the local cache 185 on the client 150 side.

Functions and techniques disclosed for context aware traffic management for resource conservation in networks (e.g., network 106 and/or 108) and devices 150, can reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1C.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 can be any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G, 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1C:
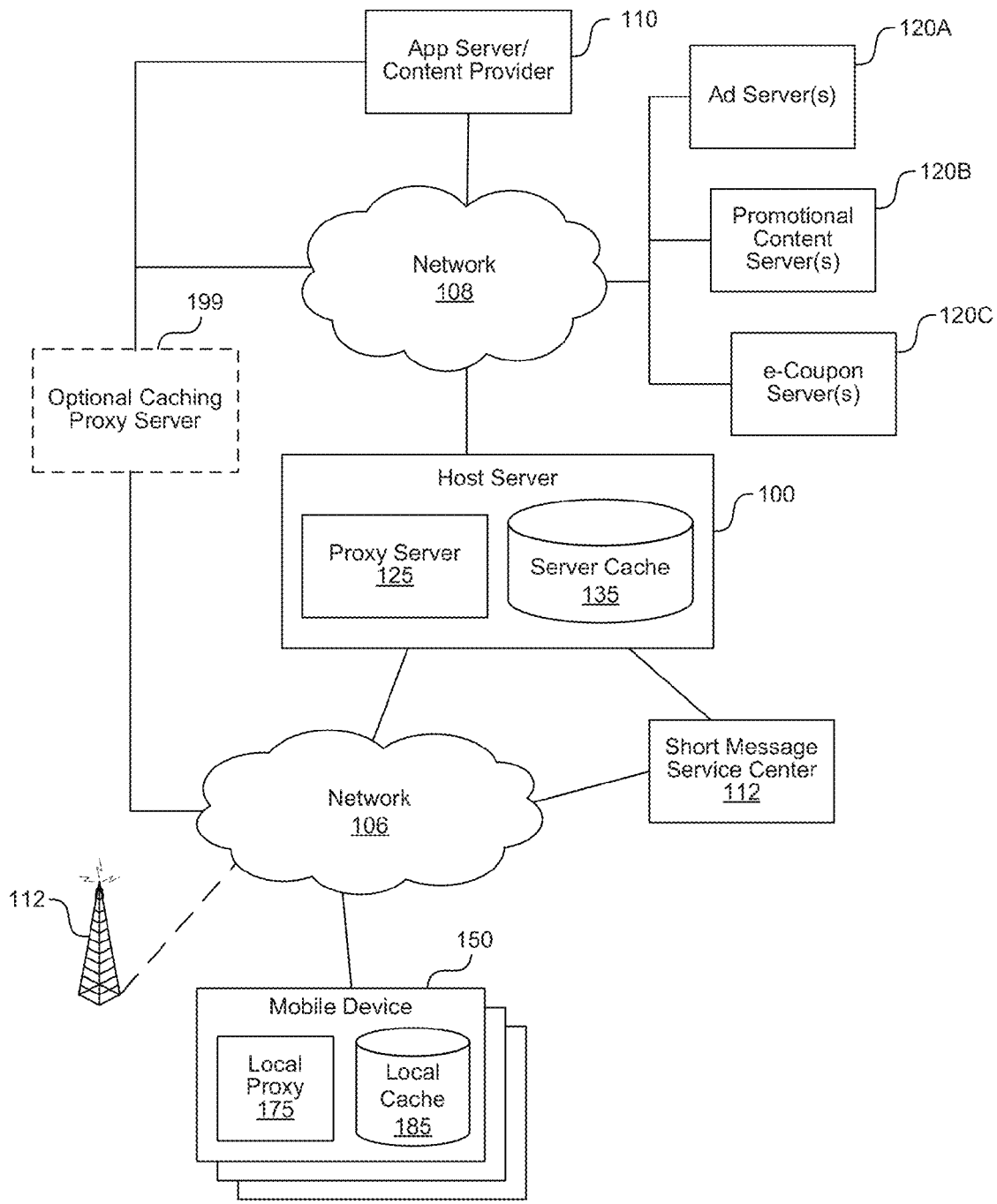
FIG. 1C depicts an example diagram of a proxy and cache system distributed between the host server and device which facilitates network traffic management between a device, an application server or content provider, or other servers such as an ad server, promotional content server, or an e-coupon server for resource conservation and content caching.

FIG. 1C illustrates an example diagram of a proxy and cache system distributed between the host server 100 and device 150 which facilitates network traffic management between the device 150 and an application server or content provider 110, or other servers such as an ad server 120A, promotional content server 120B, or an e-coupon server 120C for resource conservation and content caching. The proxy system distributed among the host server 100 and the device 150 can further track alarms, timers or other triggers implemented by applications on a device and resources used by such alarms, timers, or other triggers to determine associations using which the proxy system can manipulate the alarms, timers or other triggers to occur at an optimal time to reduce resource usage.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties, including one or more of, battery level, network that the device is registered on, radio state, or whether the mobile device is being used (e.g., interacted with by a user). In some instances, the local proxy 175 can delay, expedite (prefetch), and/or modify data prior to transmission to the proxy server 125, when appropriate.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the device 150 in achieving network traffic management. Note that 112 can also utilize any other type of alternative channel including USSD or other network control mechanisms. The host server 100 can forward content or HTTP responses to the SMSC 112 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

Figure 1D:
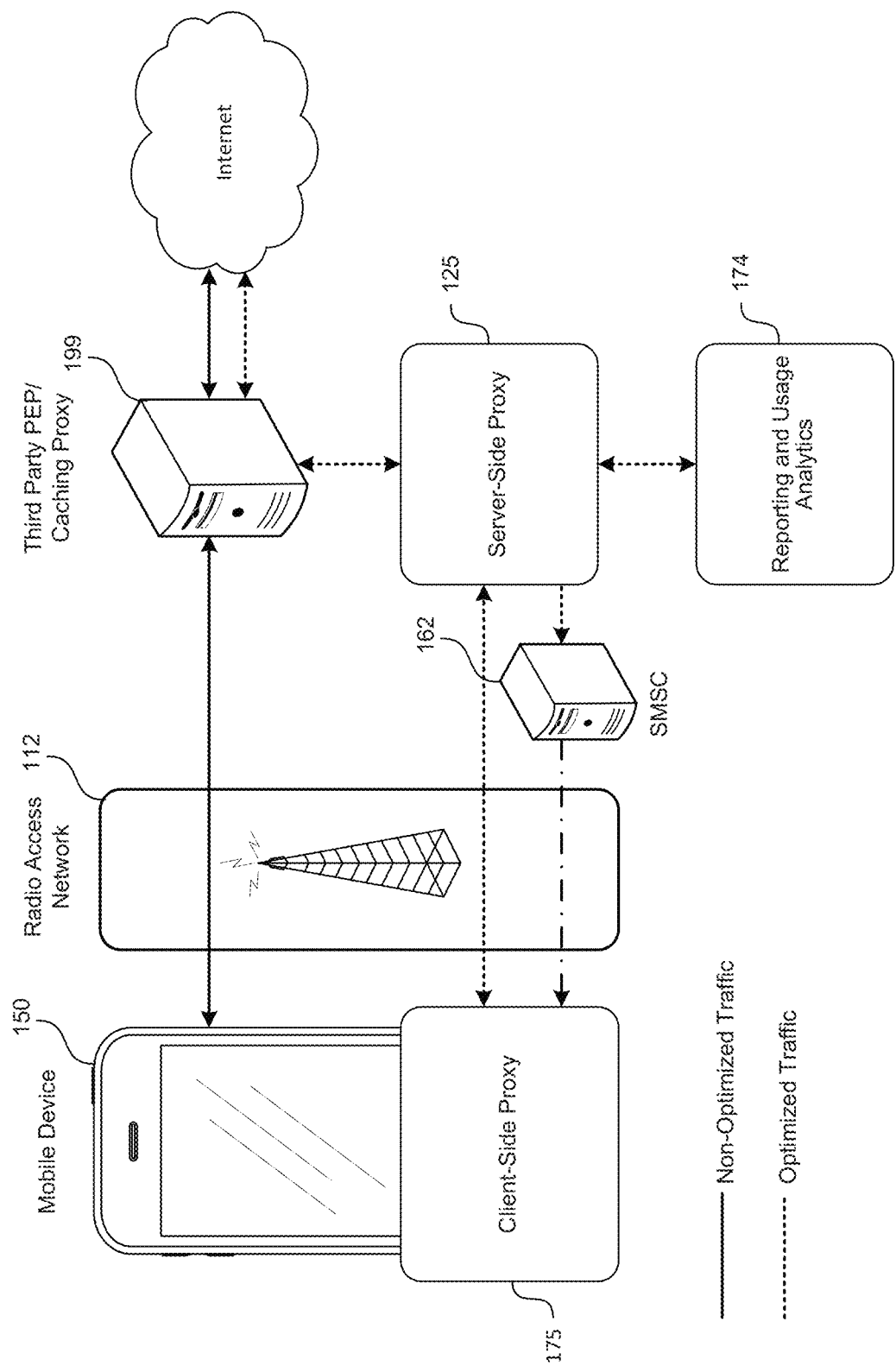
FIG. 1D depicts an example diagram of the logical architecture of a distributed proxy and cache system.

FIG. 1D illustrates an example diagram of the logical architecture of a distributed proxy and cache system.

The distributed system can include, for example the following components:

Client Side Proxy 175: a component installed in the Smartphone, mobile device or wireless device 150 that interfaces with device's operating system, as well as with data services and applications installed in the device. The client side proxy 175 is typically compliant with and able to operate with standard or state of the art networking protocols.

The server side proxy 125 can include one or more servers that can interface with third party application servers (e.g., 199), mobile operator's network (which can be proxy 199 or an additional server that is not illustrated) and/or the client side proxy 175. In general, the server side proxy 125 can be compliant with and is generally able to operate with standard or state of the art networking protocols and/or specifications for interacting with mobile network elements and/or third party servers.

Reporting and Usage Analytics Server 174: The Reporting and Usage Analytics system or component 174 can collect information from the client side 175 and/or the server side 125 and provides the necessary tools for producing reports and usage analytics can used for analyzing traffic and signaling data. Such analytics can be used by the proxy system in managing/reducing network traffic or by the network operator in monitoring their networks for possible improvements and enhancements. Note that the reporting and usage analytics system/component 174 as illustrated, may be a server separate from the server-side proxy 125, or it may be a component of the server-side proxy 125, residing partially or wholly therein.

Figure 1E:
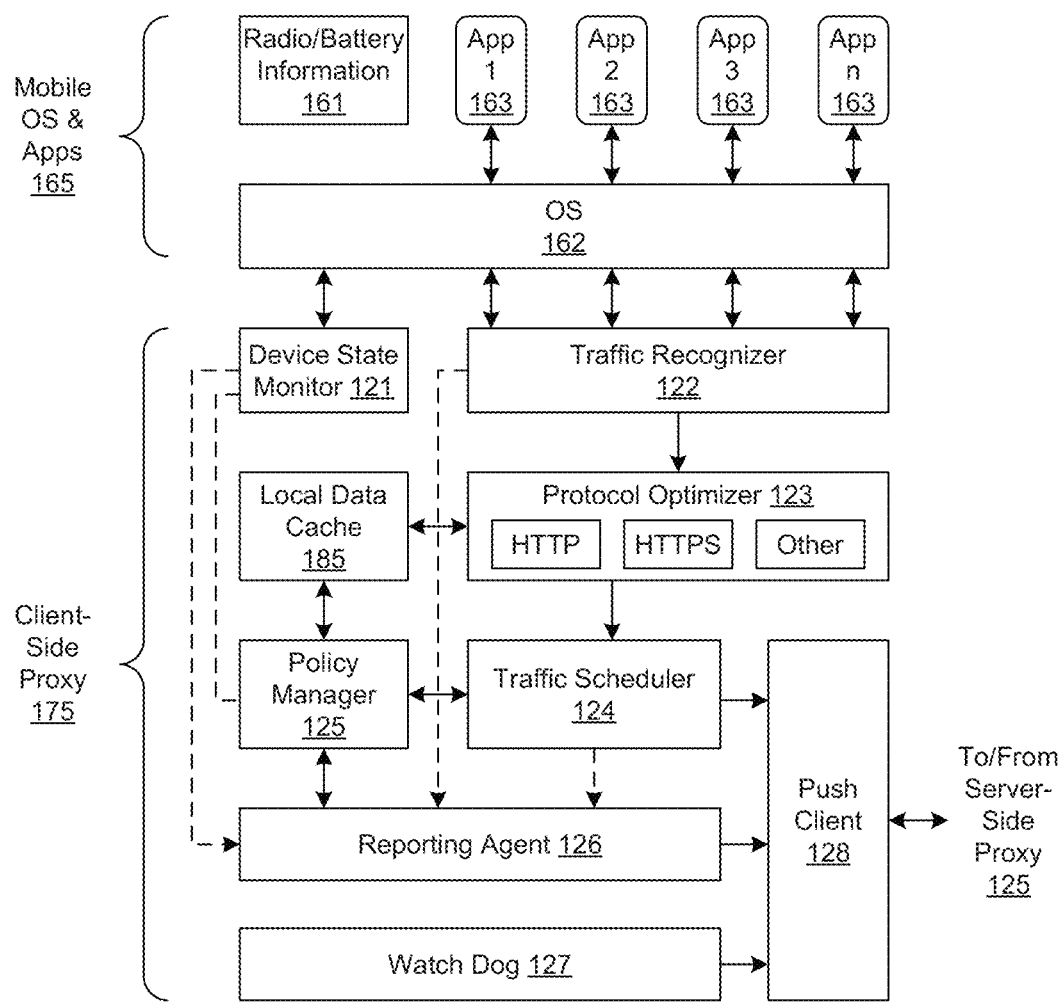
FIG. 1E depicts an example diagram showing the architecture of client side components in a distributed proxy and cache system.

FIG. 1E illustrates an example diagram showing the architecture of client side components in a distributed proxy and cache system.

The client side components 175 can include software components or agents installed on the mobile device that enables traffic optimization and performs the related functionalities on the client side. Components of the client side proxy 175 can operate transparently for end users and applications 163. The client side proxy 175 can be installed on mobile devices for optimization to take place, and it can effectuate changes on the data routes. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests. Some example components of the client side proxy 175 are described as follows:

Device State Monitor 121: The device state monitor 121 can be responsible for identifying several states and metrics in the device, such as network status, display status, battery level, etc. such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic optimization and reporting policies provisioned by a Policy Management Server (PMS). At the client side proxy 175 first start, traffic optimization and reporting policies (policy profiles) that is to be enforced in a particular device can be provisioned by the Policy Management Server.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information about the events taking place in the device and sends the information to the Reporting Server. Event details are stored temporarily in the device and transferred to reporting server only when the data channel state is active. If the client side proxy 175 doesn't send records within twenty-four hours, the reporting agent 126 may attempt to open the connection and send recorded entries or, in case there are no entries in storage, an empty reporting packet. All reporting settings are configured in the policy management server.

Push Client 128: The push client 128 can be responsible for the traffic to between the server side proxy 125 and the client side proxy 175. The push client 128 can send out service requests like content update requests and policy update requests, and receives updates to those requests from the server side proxy 125. In addition, push client 128 can send data to a reporting server (e.g., the reporting and/or usage analytics system which may be internal to or external to the server side proxy 125).

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Figure 1F:
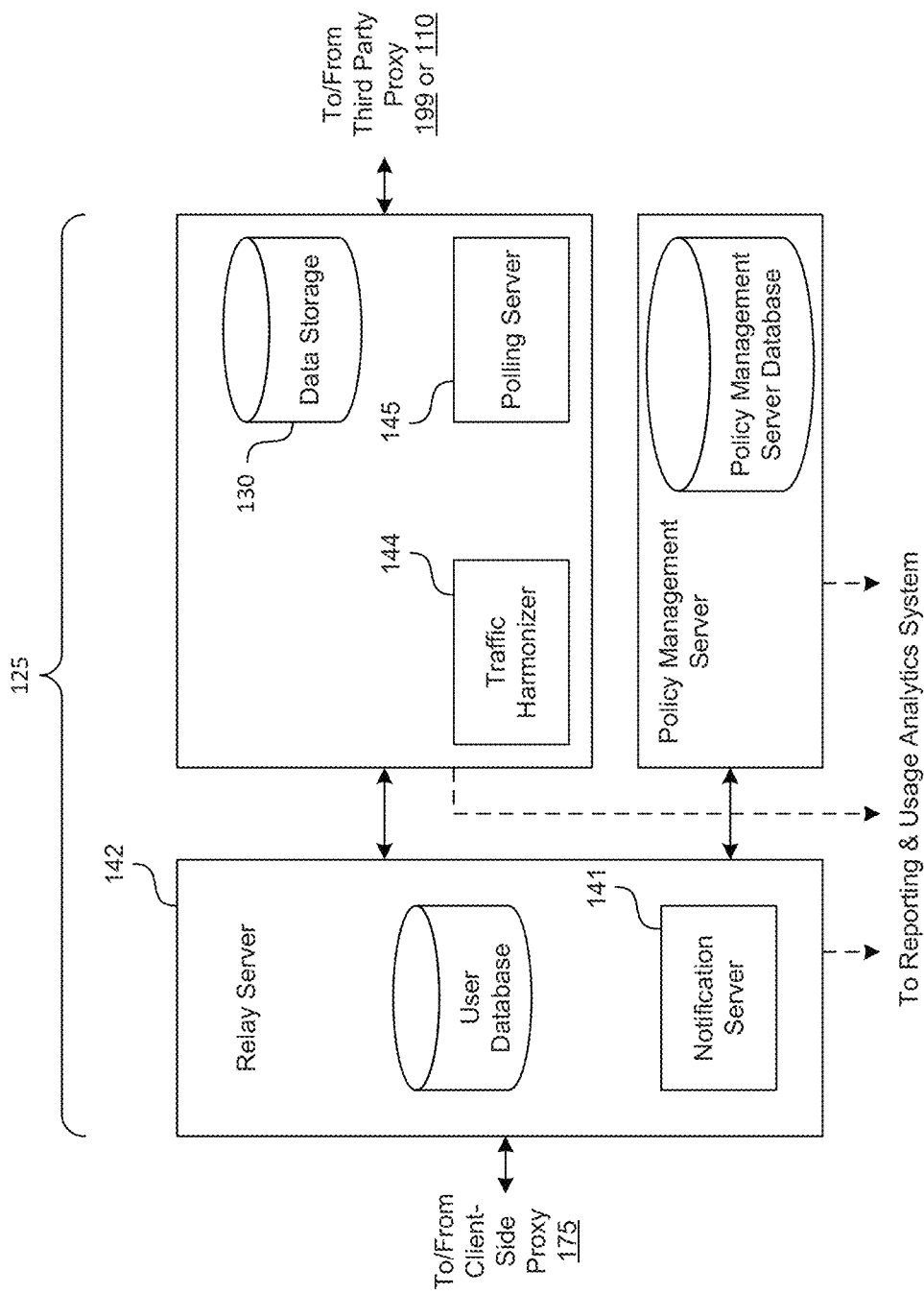
FIG. 1F depicts an example diagram of the example components on the server side of the distributed proxy and cache system.

FIG. 1F illustrates a diagram of the example components on the server side of the distributed proxy and cache system.

The server side 125 of the distributed system can include, for example a relay server 142, which interacts with a traffic harmonizer 144, a polling server 145 and/or a policy management server 143. Each of the various components can communicate with the client side proxy 175, or other third party (e.g., application server/service provider 110 and/or other proxy 199) and/or a reporting and usage analytics system. Some example components of the server side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports, provisioning, platform setup, and so on.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (device clients). It also allows administrators to notify the client-side proxies 175 about policy changes. Using the policy management server 143, each operator can configure the policies to work in the most efficient way for the unique characteristics of each particular mobile operator's network.

Reporting and Usage Analytics Component: The Reporting and Usage Analytics component or system collects information from the client side 175 and/or from the server side 125, and provides the tools for producing reports and usage analytics that operators can use for analyzing application signaling and data consumption.

Most mobile applications regularly poll their application servers to check for new data. Often there is no new data or the content has not changed, so the exchange of data through the mobile network is unnecessary. As the number of mobile phones and their applications increase, the amount of this needless polling grows. Since applications are not coordinated and poll at different times and intervals, any given phone may frequently generate signal traffic. This causes multiple unnecessary radio activations, consuming power and shortening battery life.

In one embodiment, the signaling optimizer reduces network requests to a minimum by caching content in the client and letting its own server poll for changes in the network. When a mobile phone's client side proxy (e.g., local proxy) 175 detects a recurring pattern for a resource, such as an email application, its response content is stored locally in a client cache so similar requests from that application get their response from the local cache, rather than signaling the network.

In another embodiment, systems and methods of intelligent alarm tracker and resource manipulator can be used to reduce network requests by consolidating or changing the timing of requests such that use of resources including network, battery, CPU, memory and the like can be reduced.

In some embodiments, features of the signaling optimizer and the intelligent alarm tracker and resource manipulator may be used together to obtain reduce resource usage by mobile applications on a mobile device.

Figure 2A:
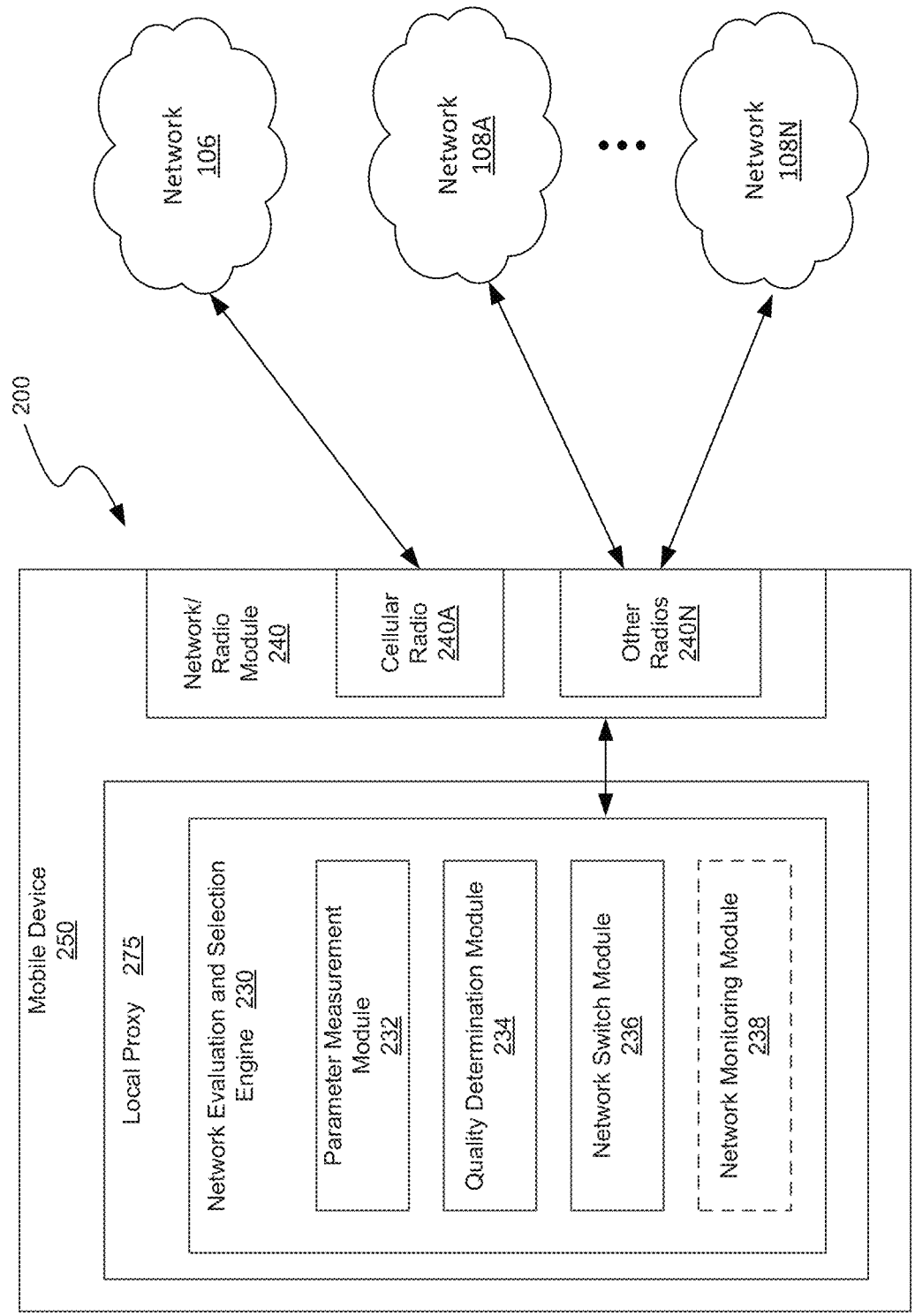
FIG. 2A depicts a diagram illustrating example resources including a network evaluation and selection engine that is implemented as a component of a local-proxy, which may be a part of a distributed caching system that effects network resource conservation and application performance optimization.

FIG. 2A depicts a diagram 200 illustrating example resources, including a network evaluation and selection engine 230 that is implemented as a component of a local-proxy 275. The local-proxy 275 may be a part of a distributed caching system (e.g., local-proxy 175 together with proxy server 125, FIG. 1A) that effects network resource conservation and application performance optimization. A mobile device 250 includes the network evaluation and selection engine 230, and a plurality of radio module 240. Each of the modules within the radio module 240 is able to connect to a particular network. For example, radio module 240 includes a cellular radio module 240A can connect to a cellular network 106. Radio module 240 also includes other radio modules 240N (e.g., a WiFi module) that can connect to other types of network 180A-N (e.g., a WiFi network). As described in relation to FIG. 1A, network 106 and 108A-N may be connected to each other, either directly or indirectly, to form a larger network (e.g., network 10, FIG. 1A) such as the Internet.

For purposes of discussion, the application layer refers to a layer(s) that is above the transport layer. In some embodiments, the application layer can refer to Layer 7 of the Open System Interconnection (OSI) model; in other embodiments, it can refer to Layer 5 of the internet protocol suite (also known as "TCP/IP") model. In any instance, the application layer is characterized as being the layer closest to the end user. Typically, both the application layer and the user (e.g., user 103, FIG. 1A) interact directly with the software application (e.g., applications 210, described below in FIG. 2C). Some examples of protocols of the application layer include NNTP, SIP, SSI, DNS, FTP, Gopher, HTTP, NFS, NTP, SMPP, SMTP, SNMP, Telnet, DHCP, and Netconf, and in some additional instances, TLS/SSL. Some examples of protocols of the transport layer include TCP, UDP, SCTP, DCCP, and SPX.

The embodiments disclosed herein recognize that the increase in the number and capabilities of mobile devices in recent years has created pressure on carriers to make the most of available wireless network resources. The embodiments disclosed herein also recognize that mobile devices (e.g., device 250) now have multimode of network capabilities. Device 250 is capable of communicating via different radio connections (e.g., through various hardware radio modules 240A-240N) with different communication networks 106 and 108A-N. Examples of such networks include cellular networks (e.g. GSM, GPRS, CDMA, 3G, 3.5G, WiMAX, LTE, 4G, etc.) or wireless broadband (e.g. WLAN or WiFi). According to some embodiments, device 250 can communicate with different communication networks during normal operation to optimize connection parameters.

As an example application of the present disclosed techniques, with multimode devices, operators seek to relieve the burden placed on overloaded mobile networks by offloading traffic to local WiFi networks, whether they are carrier-managed, public, or private. However, conventionally the operators lack adequate control to push traffic to WiFi, and suboptimal offloading decisions could lead to an adverse end-user experience. Without the proper tools in place to drive data traffic to alternative sources of wireless connectivity, the cellular data network remains overloaded while WiFi resources are underutilized. As such, the present disclosed techniques can provide such proper tool in determining when and which radio and/or network to select in order to provide the best user experience.

The present embodiments further recognize that it can be beneficial to measure the QoE from an application level, which can reduce the time to market as well as deployment to existing devices on the market because this approach generally requires no administrator permission (e.g., a root privilege) nor carrier or original equipment manufacturer (OEM) integration. In comparison, additional metrics which can be used to evaluate the QoE or user experience may include, for example, the amount of data traffic, quality of signal, power consumption characteristics of a particular network, battery status, network congestion, and so forth.

It is noted that some of these metrics use lower level (e.g., transportation layer, or internet layer) protocols and may require root privilege or OEM integration, thereby less than ideal because they are harder to deploy. Additionally, lower level protocols (e.g., TCP, or ICMP) may generally be more reflective of the network condition's perspective and less of an application's perspective; on the other hand, application layer protocols include process time and delays from specific system, and therefore they reflect more accurately on an application's actual experience of the network.

Accordingly, the present embodiments of mobile device 250 include the network evaluation and selection engine 230, which can enable data traffic offload from overburdened cellular networks to local WiFi networks, while optimizing offloading decisions to ensure a high-quality end user experience. The network evaluation and selection engine 230 includes, for example, a parameter measurement module 232, a quality determination module 234, a network switch module 236, and optionally, a network monitoring module 238, that can, alone or in any combination with the other modules, perform the network evaluation and selection techniques disclosed herein. According to some embodiments, the network evaluation and selection engine 230 can select the best radio (e.g., between Cellular radio 240A versus other radio 240N) and/or select the best network (e.g., among networks 108A-108N) based on the QoE determined by the techniques disclosed herein.

The network evaluation and selection engine 230 can, for example, quantify the user experience (e.g., by generating a quality of experience (QoE) number for a given network or networks) so that it can be used to select one or more radios (e.g., among network modules 240A-N) for data traffic offloading (e.g., to WiFi), selecting the best network (e.g., among different WiFi networks), gathering quality statistics of mobile networks at different time/location, or for a given application, and/or other suitable purposes.

For example, in some embodiments, the measured QoE can then be used to actively selectively enable one or more radios or radio modules on the mobile device in order to provide the optimal or the best user experience in general, and/or with respect to a specific conditions, for example, for a given application or most applications at certain times of day or days of week, etc. In another example, the measured QoE can then be used to select one or more networks. In yet some other embodiments, the measured QoE can be used to enable radios and/or selection of networks (e.g., the best Wi-Fi network available or accessible, or the best mobile/cellular network within accessible range, or among 3G/4G/LTE and WiFi networks).

The parameter measurement module 232 can measure a set of parameters for each of the available or otherwise accessible networks using an application layer protocol. In some instances, the set of parameters can be measured by communicating one or more servers within a respective network. These servers can include any (public, or in some instances, private) servers that are generally stable and constantly available, thereby suitable for use as a gauge of network performance. An example list of these servers include "www.yahoo.com", "www.google.com", and "www.cnn.com".

More specifically, in accordance with some embodiments, the parameter measurement module 232 can make standard system calls from an application layer level (e.g., via HTTP, as compared to a transportation layer level such as TCP) to perform Round Trip Time (RTT) measurements. In addition to RTT, percentage of Packet Loss (PL) can also be computed from the application level, and then, in one embodiment, one or both of RTT and PL can serve as a basis to determine the Quality of experience (QoE) or other metrics measuring user experience. In one embodiment, the application layer protocol is able to establish communication with the servers without requiring an administrative privilege (e.g., root) of the mobile device.

Figure 4:
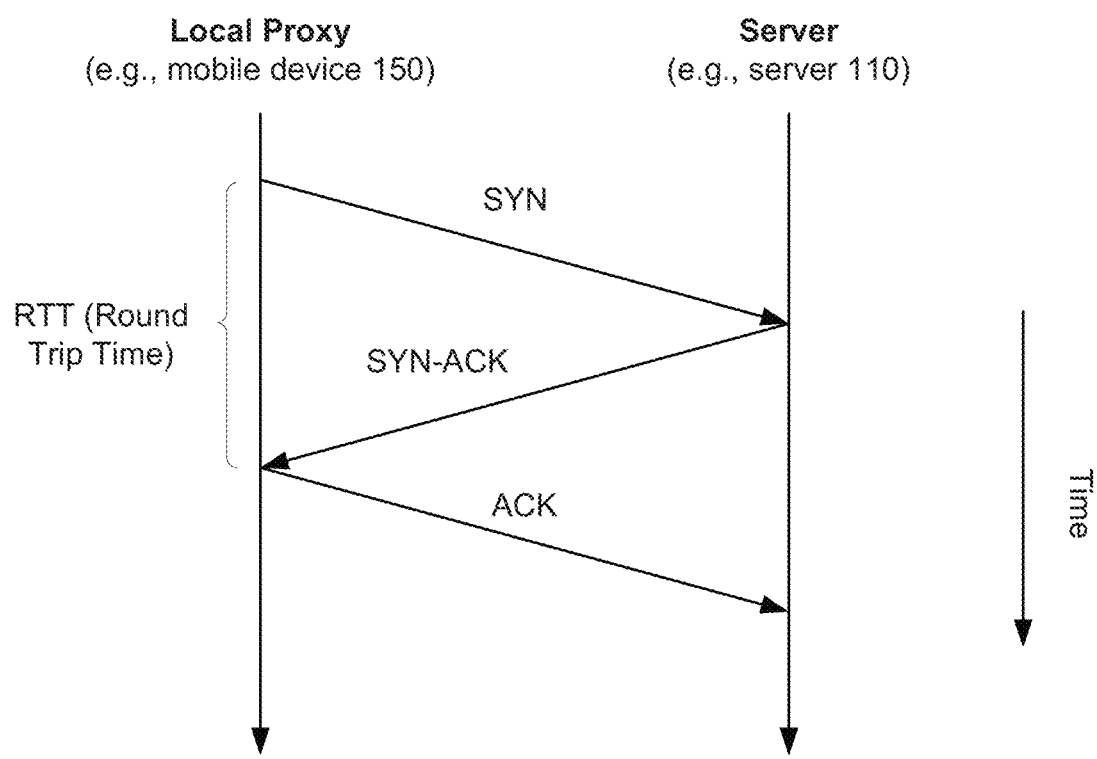
FIG. 4 depicts a diagram illustrating a ping mechanism for parameter measurements which can be used in the network evaluation and selection engine.

In one or more embodiments, the RTT numbers can be measured by establishing an HTTP socket connection (e.g., with a server) for performing an "HTTP Ping." Similar to a well-known TCP or ICMP Ping command, the HTTP Ping command which can be initiated by the parameter measurement module 232 which corresponds to a TCP three-way handshake protocol, including a "synchronize (SYN)" message, a "synchronize-acknowledgement (SYN-ACK)" message, and a "acknowledgement (ACK)" message. Such three-way handshake protocol is illustrated by way of example in FIG. 4. As illustrated in FIG. 4, an RTT number for a server can be calculated as the difference between the sent time of the SYN message and the receipt time of the SYN-ACK message. Additionally, every HTTP socket connection is followed by a socket close (e.g., FIN-ACK, ACK, etc.).

Further, in one embodiment, a transmitted packet (or message) can be considered "lost" if during an HTTP socket connection either a "Timeout" (e.g., one second for each HTTP socket connection) or an "I/O exception" occurs. A percentage or probability of Packet Loss (PL) can be, for example, calculated by the parameter measurement module 232 for each HTTP socket connection.

In some embodiments, for every period of QoE calculation, a Domain Name System (DNS) query is made by the parameter measurement module 232 (e.g., to translate a server's domain name into numerical IP addresses), and the DNS results can be stored on mobile device 250. In some embodiments, if the DNS query fails on any server, and if the DNS results from the last successful DNS query on the same radio are available, then the parameter measurement module 232 use those results to perform its QoE calculations. However, if the DNS query fails on all servers and there are no previous result, then the evaluation and selection engine 250 reports the QoE as "0" or "none".

Moreover, some embodiments of the parameter measurement module 232 can perform a pseudo or a dummy HTTP Ping prior to the measuring to wake up a radio (e.g., cellular radio 240A) which corresponds to a respective network, and the results from this pseudo or dummy Ping is not measured. In some instances, dummy Pings can be sent to servers, and in one embodiment, one dummy Ping can be sent to each server. So, for example, if there are three servers (e.g., Yahoo, Google, CNN), then a total of three dummy Pings are sent. Notably, a Timeout period for a dummy Ping can be different than a Timeout period for an actual Ping from which RTT and/or PL results are measured. One example of a Timeout for each dummy Ping is 20 seconds, and an example of Timeout for each actual Ping is 1 second.

Then, in one or more embodiments, the parameter measurement module 232 sends out, for example, 5 Pings to each server. If there are, for example, three servers, then a total of 15 actual Pings are sent. Note that any number of servers can be used. Additionally or alternatively, the HTTP Pings can be sent by the parameter measurement module 232 to each server in a sequential manner (e.g., using a Round-Robin scheduling). Take the embodiment with three servers as an example, a first Ping can be sent to server A, a second Ping to server B, a third Ping to server C, a forth Ping to server A, and so forth.

After the parameter measurement module 232 gathers, for a given network, the Round-Trip Time (RTT) and/or Packet Loss (PL) parameters or other parameters for the applicable servers, the quality determination module 234 can determine, compute or assess a quality level or an overall quality level for the given networks based on the parameters. More specifically, in some embodiments, the quality determination module 234 first calculates a statistical parameter of the RTT and/or the PL, for example, a median RTT and an average PL (%) number for each server based on the readings (e.g., from the five actual Ping per server, or some other number of pings). It is noted that median RTT and average PL are example metrics which can be used to assess the quality of experience (QoE) or user experience and the like with an application at a mobile device for a specific network (e.g., to facilitate choosing among different WiFi networks, and/or different Cellular networks) or for a given radio (e.g., to facilitate choosing between WiFi versus Cellular); other suitable mathematical and/or statistical quantifiers can be computed or determined for evaluating quality of experience (QoE) or other types of user experience.

Then, with the median RTT and/or the average PL for one or each server, the quality determination module 234 can assign a specific quality level to the servers, for example, based on a quality table which is specific to the given network or radio. FIGS. 5A and 5B respectively depict two examples of such network specific quality tables: a table for a Cellular network or radio is depicted in FIG. 5A, and a table for a WiFi network or radio is depicted in FIG. 5B.

With the assigned specific quality level for each of the server within a given network, the quality determination module 234 can select from the assessed quality levels. In some embodiments, the quality level (QoE) selected is the highest or near the highest level out of the assessed quality levels. For the example with the three predetermined servers, the overall QoE is selected based on the best QoE out of the three specific QoEs of the three servers. For purposes of discussion herein, the term "highest" is measured in light of the assigned specific quality levels; for example, a QoE number of 5 is better than a QoE of 4, and a QoE of 4 is better than a QoE of 3, etc. In general, the shorter the RTT numbers and the smaller the PL numbers are, the better the network quality is. In some embodiments, it can thus be inferred that the quality of experience is higher when connected to the network; and the network and/or the radio used for connecting to the network can preferentially be selected, for example, in applicable circumstances (e.g., when a given mobile application is being used or at certain times of day, or days of the week, etc.).

Additionally or alternatively, the overall QoE can be converted, determined, assessed, or computed from the specific QoE numbers based on suitable formulas (e.g., as can in some instances be determined by carriers). In one example, the conversion formula is:
Specific QoE of (6 or 5)=Overall QoE of 2 (Good)
Specific QoE of (4 or 3)=Overall QoE of 1 (Usable)
Specific QoE of (2 or 1)=Overall QoE of 0 (Unusable)

Also, in some embodiments, QoE of 0 (Unusable) can be declared by the quality determination module 234 if the time to get QoE results takes more than some configurable amount of time (e.g., 15, 30, 60, 120 seconds).

In some embodiments, the QoE can be determined on an application-by-application basis on each mobile device or for each user.

The network switch module 236 can further choose the network (e.g., among the radio modules 240) based on the quality level of each network. It is noted that it is not necessary for the network switch module 236 to choose only one network over another network; some embodiments of the network switch module 236 can select more than one network for offering better user experience, offloading, and/or other suitable purposes.

More specifically, the network evaluation and selection engine 230 can employ the switch module 236 to switch network based on the above-said QoE assessment(s). In some embodiments, the switch can be among different networks under the same radio; in some embodiments, the switch can be among different networks across different radios.

For one example of switching network under the same radio, the engine 230 can switch from a 4G cellular network to a 3G cellular network under the same cellular radio module (even though, depending on the particular implementation of cellular radio chip, circuitry components and/or antennas that respectively in charge of 3G/4G connections may be different or the same). For another example, the engine 230 can switch from a cellular network offered by base station A to another cellular network offered by base station B under the same cellular radio module. For yet another similar example, the engine 230 can switch from one WiFi network offered by an access point A to another WiFi network offered by an access point B under the same WiFi radio module.

For one example of switching network across different radios, the engine 230 can switch from a 4G cellular network to a IEEE 802.11N WiFi network; and in doing so, the engine 230 can selectively switch from the cellular radio to the WiFi radio.

Furthermore, as additional or alternative embodiments, the network evaluation and selection engine 230 can continuously monitor the network condition and/or other parameters for network switching (e.g., Wi-Fi offloading) opportunities. As mentioned, evaluation and selection can measure the subscriber quality of experience (QoE) for available networks in real time or near real time to ensure a satisfactory subscriber experience.

This can be used actively by the mobile device 250 (e.g., via the local proxy 275) to make a decision to connect to the best radio (e.g., 3G/4G or Wi-Fi) and/or the best network (e.g., WiFi networks offered among different access points), or for use in WiFi offloading (e.g., by an operator). In addition, operators or carriers can further utilize the results from the QoE assessment of their mobile networks of cell towers at various times and/or at different locations.

In specific, the network evaluation and selection engine 230 can include a network monitoring module 238 which can perform the aforementioned measuring (e.g., of RTT and PL parameters) and determining (e.g., of specific and overall QoE numbers) periodically. In one embodiment, the network monitoring module 238 causes the network switch module 236 to perform the aforementioned choosing when an overall quality level of a previously selected network deteriorates by a level (e.g., below a certain number (such as drop to 2), below a certain degree (from usable to unusable), drops a certain percentage (by 33%), etc.). For example, the network monitoring module 238 determines that the overall quality level of a previously selected network has dropped from a usable level to an unusable level, then the aforementioned network evaluation and selection processes can be triggered.

In this way, among other advantages, embodiments disclosed herein enable a quantified approach to user experience estimation and application-level Quality of Experience (QoE) measurements, which can serve as bases for selection of networks for the applications. The embodiments disclosed herein also enjoy the benefits of reduced time to market as well as deployment to existing devices on the market.

Figure 2B:
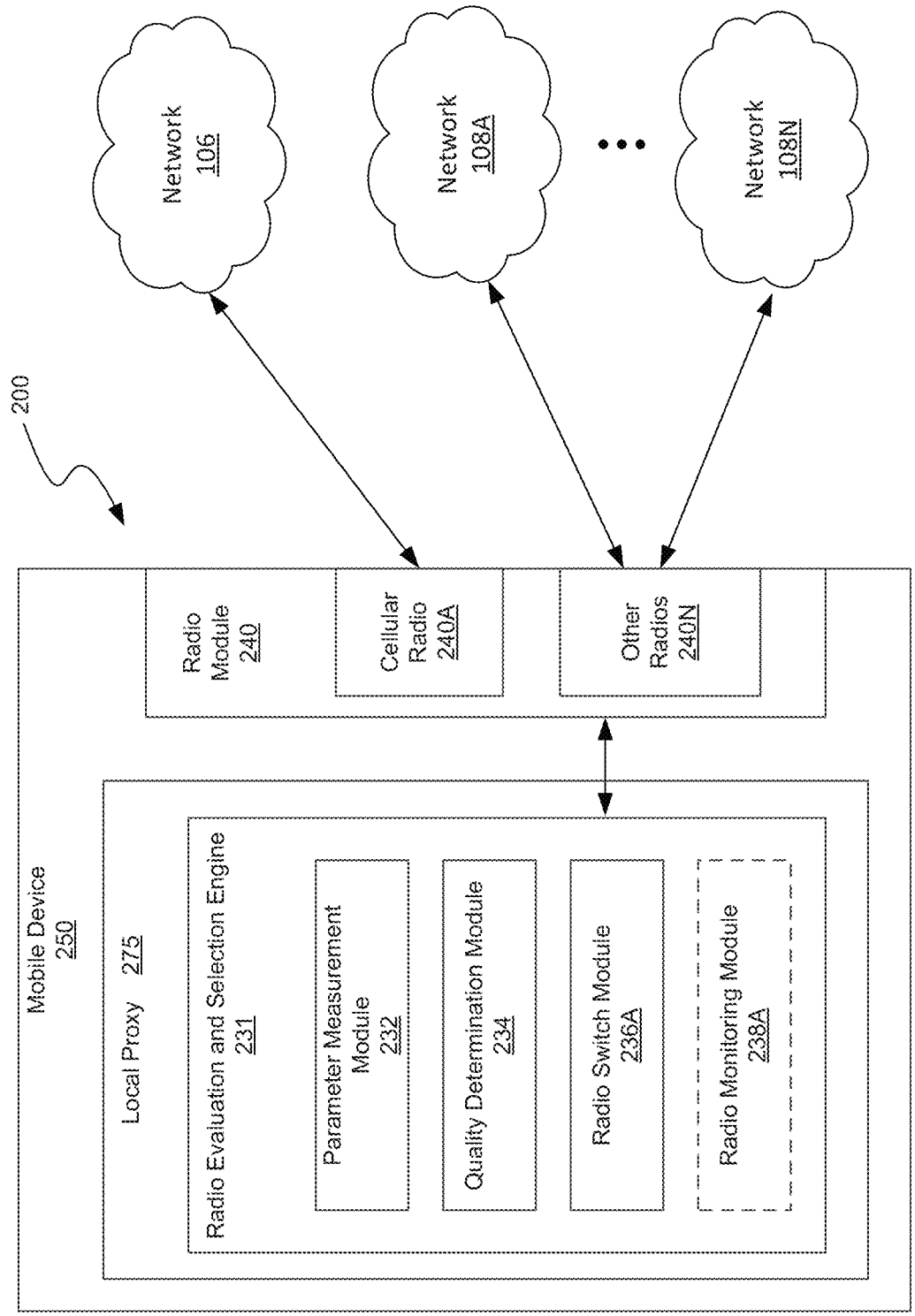
FIG. 2B depicts a diagram illustrating example resources including a radio evaluation and selection engine that is implemented as a component of a local-proxy, which may be a part of a distributed caching system that effects network resource conservation and application performance optimization.

FIG. 2B depicts a diagram illustrating example resources including a radio selection engine that is implemented as a component of a local-proxy, which may be a part of a distributed caching system that effects network resource conservation and application performance optimization. The radio evaluation and selection engine 231 includes similar modules as those in the network evaluation and selection engine 230. The radio evaluation and selection engine 231 includes a radio switch module 236A and a radio monitoring module 238A for radio selection. Adapting similar evaluation and QoE determination techniques as described above with respect to the network evaluation and selection engine 230, the radio evaluation and selection engine 231 can use a quantified approach to user experience estimation and application-level Quality of Experience (QoE) measurements, which can serve as bases for selection of radios for the applications.

Figure 2C:
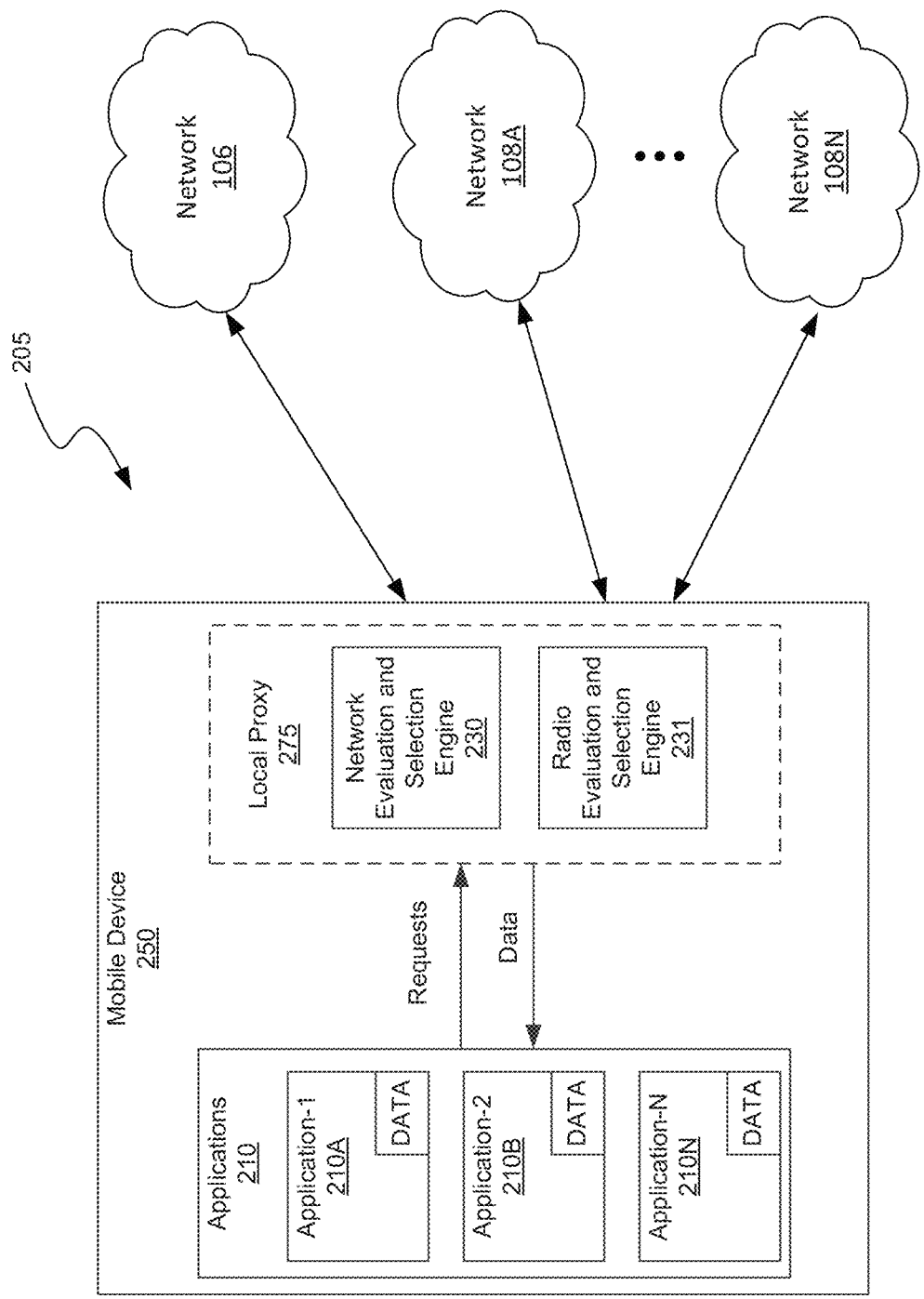
FIG. 2C depicts another example diagram illustrating the network evaluation and selection engine of FIG. 2A and the radio evaluation and selection engine of FIG. 2B being implemented in some embodiments where the local-proxy can be optional.

FIG. 2C depicts another example diagram illustrating the network evaluation and selection engine 230 of FIG. 2A and the radio evaluation and selection engine 231 of FIG. 2B being implemented in some embodiments where the local-proxy 275 can be optional.

Applications 210 (e.g., applications 210A-210N) are example applications of the mobile device 250. Applications 102 on mobile device 250 can communicate with the application servers 110 (see FIG. 1A) via the networks 106 and 108A-N. Some examples of applications 210 include news application, weather services, web browsers with multimedia capabilities, video-sharing applications, online radio and music stations, video-on-demand services, and/or social network applications. In general, each application 210 receives a plurality of data (e.g., audio streams or video clips) relevant or necessary to the operations (e.g., foreground and/or background operations) of the application from the application servers 110.

In addition to the above described functions of the network evaluation and selection engine 230, in some embodiments, the embodiments of local proxy 275 can enable carriers with policy-based control of offloading decisions (e.g., performed by the engine 230) by allowing the carriers to control and manage the policies (e.g., quality tables, quality level formulas, etc.) through suitable means. Examples of such suitable means can include communications through the aforementioned proxy servers or other suitable components. In one example, the aforementioned quality tables and formulas for quality calculations can be defined/downloaded from the proxy server. These carrier-defined offloading policies can be enforced at the source of data traffic—the mobile client 250 (e.g., via the engine 230). In this way, the local proxy 275 identifies and takes advantage of offloading opportunities as they become available, thereby creating more available resources by directing subscribers to local WiFi networks to fulfill their mobile data requirements. As such, carrier costs can be reduced because more traffic is directed to lower-cost WiFi resources, rather than relying on higher-cost cellular network resources.

In some embodiments, network evaluation and selection engine 230 (e.g., in conjunction with the local proxy 275) can further include multiple configurable parameters including security, data usage, application context, battery life, speed/quality of connection, location, and time of day in considering the QoE ratings.

As such, among other benefits, the local proxy 275 implementing the present disclosed techniques can enhance end-user quality of experience, increase WiFi offload utilization, empower carriers with policy-based control, and deliver insight into mobile client behavior, improve network capacity utilization.

Figure 3:
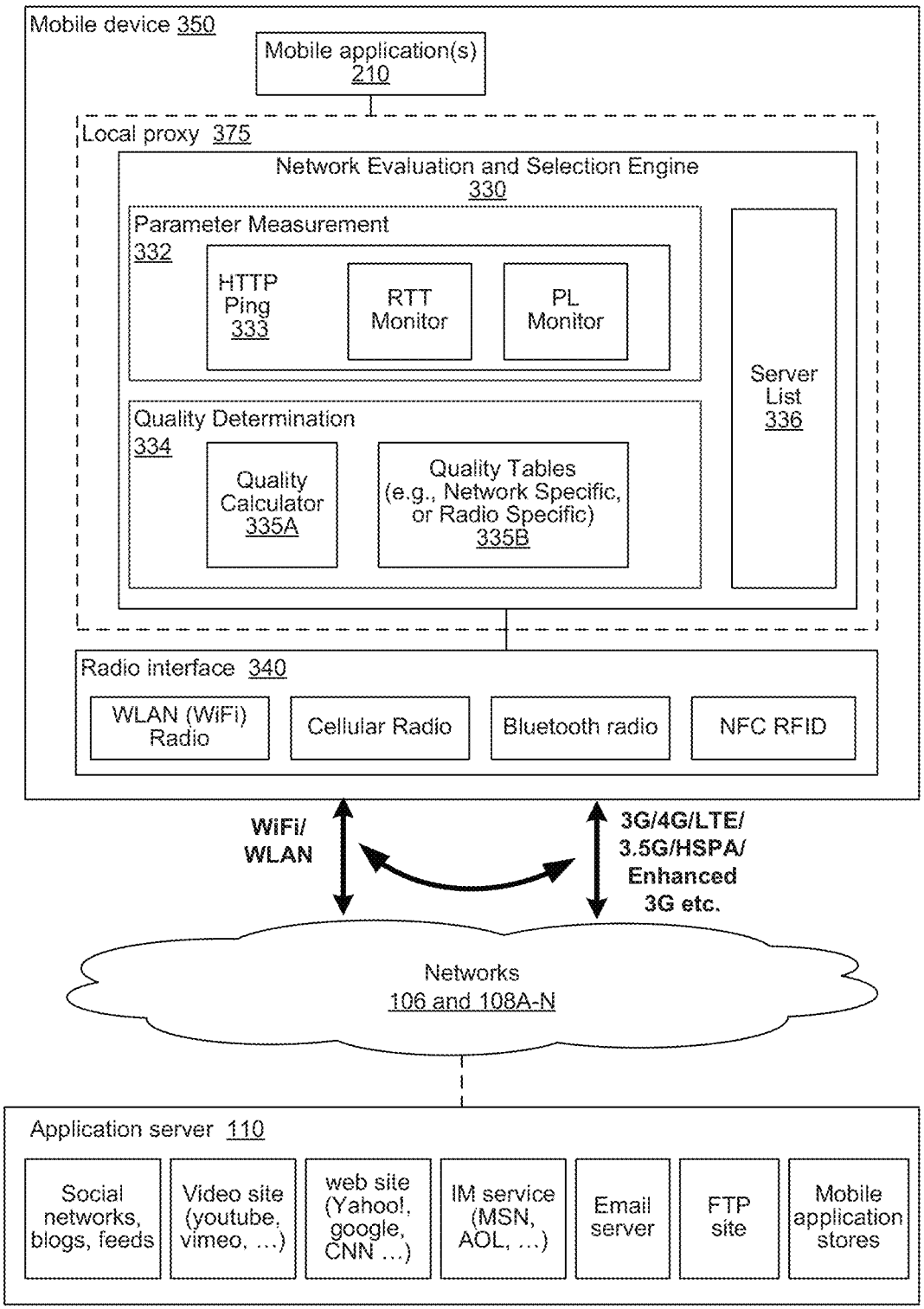
FIG. 3 depicts a functional block diagram illustrating example components of a mobile device including a local proxy having a network evaluation and selection engine.

FIG. 3 depicts a functional block diagram illustrating example components of a mobile device 350 including a local proxy 375 having a network evaluation and selection engine 330. The mobile device 350 further includes either accessible or installed thereon mobile application(s) 210 (see FIG. 2B), and a radio interface 340 including a plurality of network modules, each operable to connect to and communicate with networks 106 and 108A-N. Examples of the radios in the radio interface 340 include a cellular radio, a Bluetooth radio, and/or a WiFi or WLAN (WiFi) radio. In one embodiment, the mobile device 350 also includes an RFID based near-field communication chip. The local proxy 375 can function as an intermediate stage or interface between the networks 106 and/or 108A-N and the mobile application(s) 210 on the mobile device 350. Overall, the mobile device 350 can communicate with any application server 110 for exchanging data (e.g., directly or through host server 100, see FIG. 1A).

The network evaluation and selection engine 330 includes a parameter measurement module 332, a quality determination module 334, and a server list 336. For simplicity, other modules such as the aforementioned network switch module and network monitoring module are not depicted in FIG. 3.

Figure 6A:
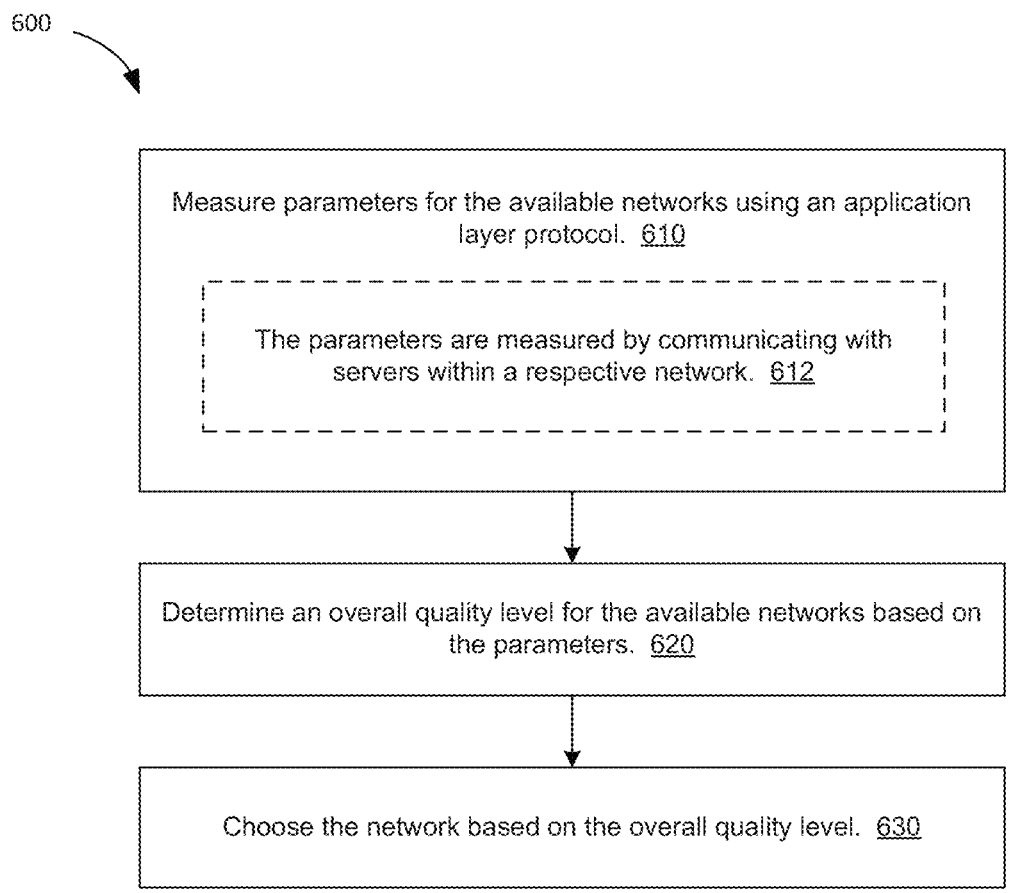
FIG. 6A depicts a flow chart illustrating an example flow for network evaluation and selection.

FIG. 6A depicts a flow chart illustrating an example flow 600 for the network evaluation and selection techniques disclosed herein. With additional reference to FIGS. 2A and 3, flow 600 is explained.

To select a preferable network for mobile applications 210 (e.g., for performance, offloading, statistics gathering, and/or other suitable purposes), the network evaluation and selection engine 230, 330 is to determine an over quality of experience (QoE) number for each network of interest.

First, the parameter measurement module 332 in the network evaluation and selection engine 230, 330 measures (610) a set of parameters for each of the available networks using an application layer protocol. In some instances, the set of parameters are measured (612) by communicating with each of a plurality of servers within a respective network. For example, to determine the overall QoE number for WiFi, the parameter measurement module 332 includes an HTTP Ping module 333 to send out Ping commands (e.g., with handshaking such as illustrated in FIG. 4) to each server on a server list 336. In one or more embodiments, the parameter measurement module 332 sends out multiple pings (e.g., 5 Pings) to each server.

Then, the RTT monitor and PL monitor in the HTTP Ping module 333 can measure Round Trip Time (RTT) times and Packet Loss (PL) percentage numbers based on those multiple (e.g., 5) Pings to each server. Additionally or alternatively, the HTTP Pings module 333 can send the Ping messages to each server using Round-Robin scheduling.

Next, the quality determination module 334 determines (620) an overall quality level for each of the available networks based on the parameters. Thereafter, the network switch module 336 chooses (630) one or more networks (e.g., among the network modules 240) based on the overall quality level of each network.

Figure 6B:
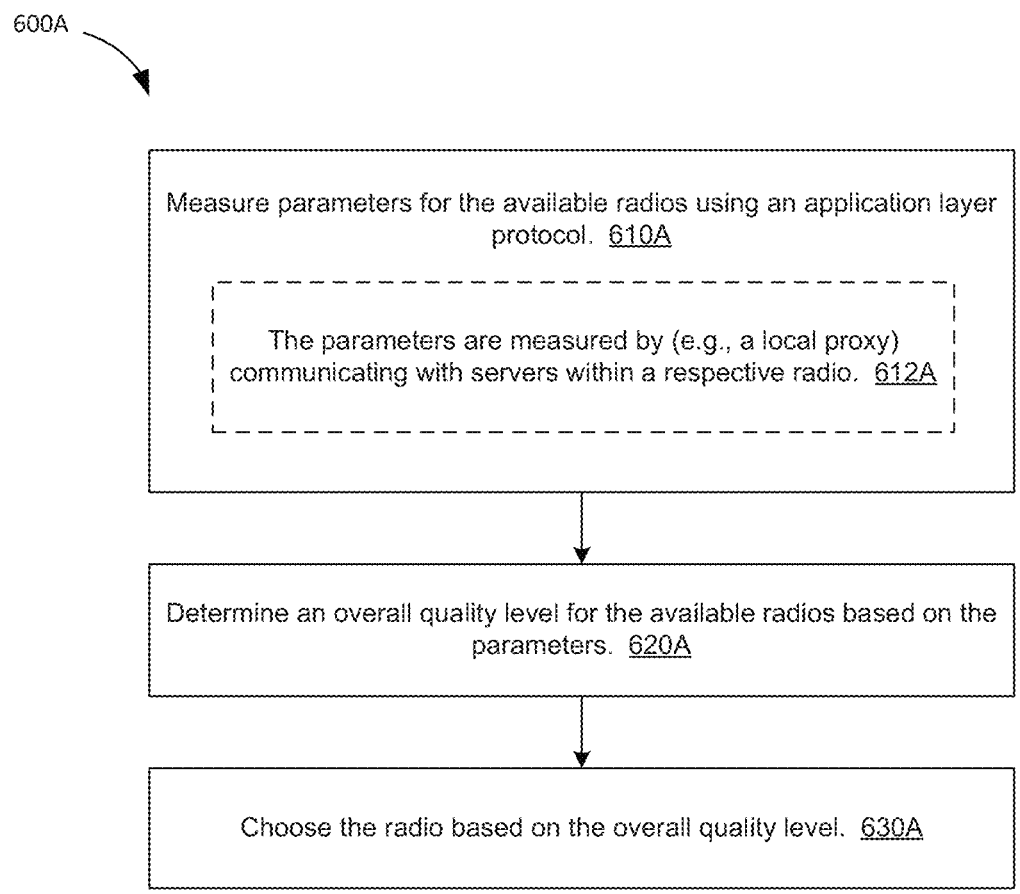
FIG. 6B depicts a flow chart illustrating an example flow for radio evaluation and selection.

FIG. 6B depicts a flow chart illustrating an example flow for radio evaluation and selection; depicts a flow chart illustrating an example flow 600A for the radio evaluation and selection techniques disclosed herein. With additional reference to FIGS. 2B and 3, flow 600A is explained.

To select a preferable radio for mobile applications 210 (e.g., for performance, offloading, statistics gathering, and/or other suitable purposes), the radio evaluation and selection engine 231 is to determine an over quality of experience (QoE) number for each radio of interest.

First, the parameter measurement module in the radio evaluation and selection engine 231 measures (610A) a set of parameters for each of the available radios using an application layer protocol. In some instances, the set of parameters are measured (612A) by communicating with each of a plurality of servers within a respective radio. For example, to determine the overall QoE number for WiFi, the parameter measurement module includes an HTTP Ping module to send out Ping commands (e.g., with handshaking such as illustrated in FIG. 4) to each server on a server list. In one or more embodiments, the parameter measurement module sends out multiple pings (e.g., 5 Pings) to each server.

Then, the RTT monitor and PL monitor in the HTTP Ping module can measure Round Trip Time (RTT) times and Packet Loss (PL) percentage numbers based on those multiple (e.g., 5) Pings to each server. Additionally or alternatively, the HTTP Pings module can send the Ping messages to each server using Round-Robin scheduling.

Next, the quality determination module determines (620A) an overall quality level for each of the available radios based on the parameters. Thereafter, the radio switch module 236A chooses (630A) one or more radios (e.g., among the radio modules 240) based on the overall quality level of each radio.

Figure 7:
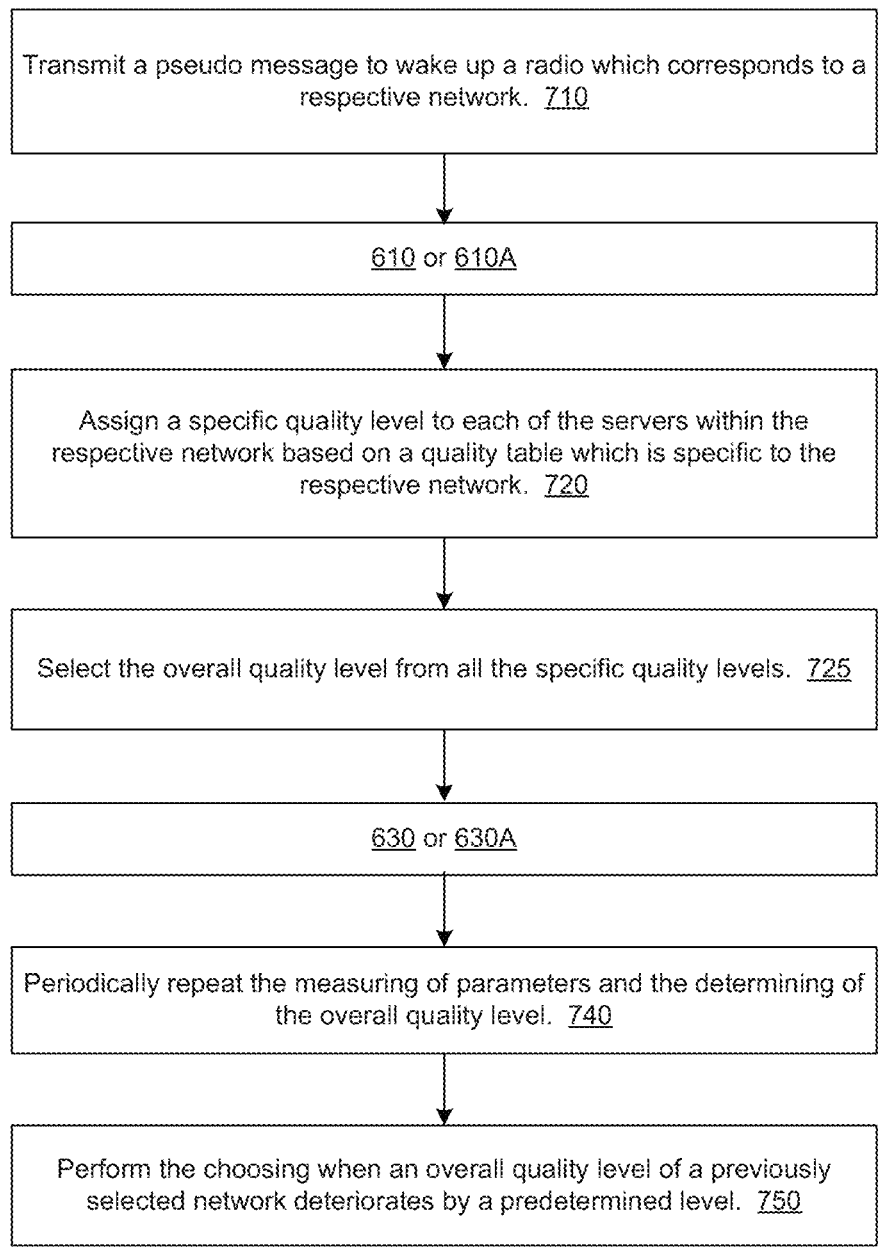
FIG. 7 depicts a flow chart of illustrating additional or alternative details of the example flows of FIGS. 6A-6B.

FIG. 7 depicts a flow chart 700 of illustrating additional or alternative details of the example flow 600 of FIG. 6. With additional reference to FIGS. 2A, 2B and 3, flow chart 700 is explained. Steps 610/610A and 630/630A are the same as what are described above.

Some embodiments of the parameter measurement module 332 can transmit (710) a pseudo or a dummy HTTP Ping message prior to the measuring to wake up a radio (e.g., cellular radio 240A) which corresponds to a respective network, and the results from this pseudo or dummy Ping is not measured. In some implementations, one dummy Ping is performed per server.

In some embodiments, to perform the aforementioned step 620, the quality determination module 334 can assign (720) a specific quality level to one or more servers within the respective network based on a quality table which is specific to the respective network. For example, a quality calculator module 335A within the quality determination module 334 can calculate a median RTT and/or an average PL (%) number for one or more servers based on the readings. Then, with the median RTT and the average PL for one or more servers, the quality determination module 334 assigns (720) a specific quality level to each of the servers based on a quality table 335B which is specific to the given network (e.g., as tables illustrated in FIGS. 5A-5B).

With the assigned specific quality level for each of the server within a given network, the quality determination module 334 then selects (725) a quality level from the assessed quality levels. In some embodiments, the quality level (QoE) selected is the highest or of a higher level out of the assessed quality levels. Additionally or alternatively, the overall QoE can be converted or computed from the specific QoE numbers based on suitable or efficient formulas.

In some embodiments, the network evaluation and selection engine 230 or the radio evaluation and selection engine 231 can repeat (740) the aforementioned measuring (e.g., of RTT and PL parameters) and determining (e.g., of specific and overall QoE numbers) periodically. In one embodiment, the network evaluation and selection engine 230 performs (750) the aforementioned network selection when the quality level of a previously selected network deteriorates. In another embodiment, the radio evaluation and selection engine 231 performs (750) the aforementioned radio selection when the quality level of a previously selected radio deteriorates.

Figure 8:
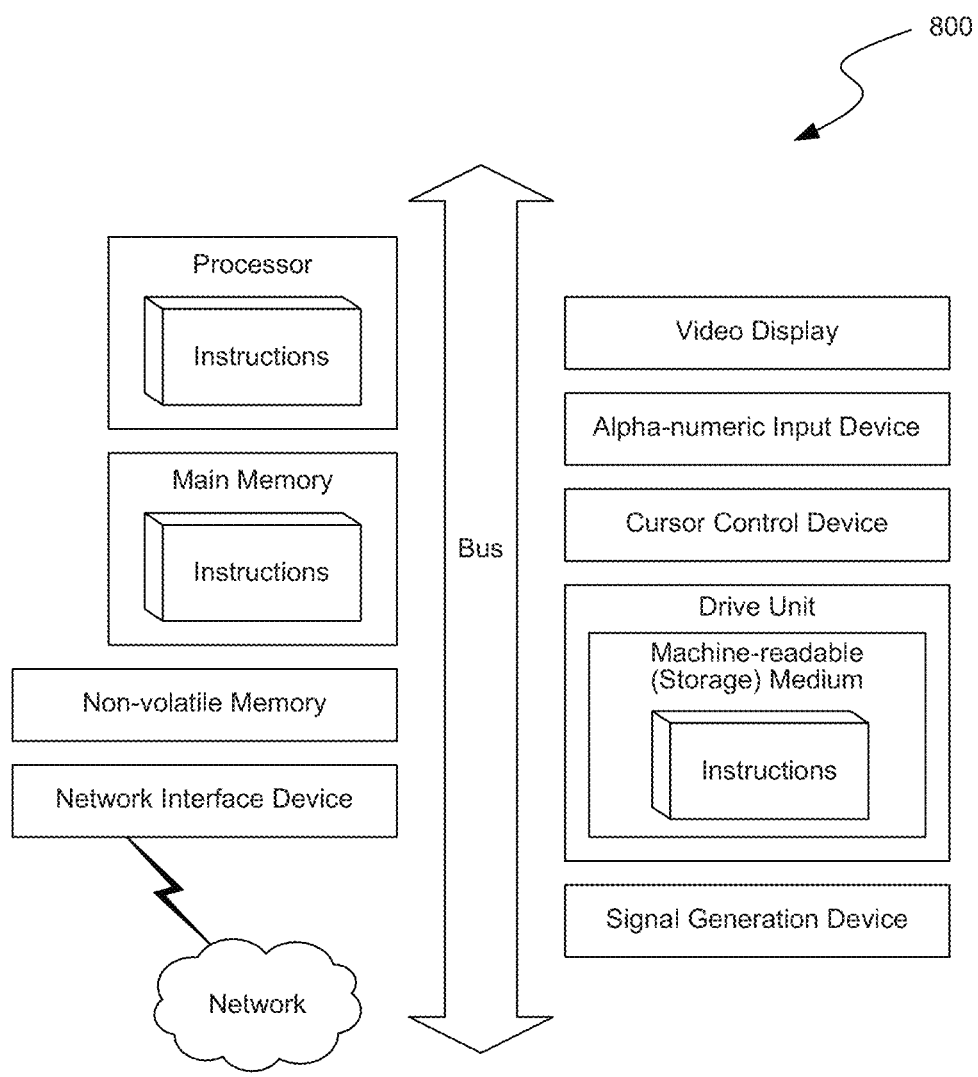
FIG. 8 shows a diagrammatic representation of a machine in the example form of a computer system within which a set of instructions, for causing the machine to perform any one or more of the methodologies discussed herein, may be executed.

FIG. 8 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claim intended to be treated under 35 U.S.C. §112, 6 begins with the words "means for.") Accordingly, the applicant reserves the right to add additional claims after filing the application to pursue such additional claim forms for other aspects of the disclosure.

What is claimed is:

1. A method for selecting a network from a number of available networks at a mobile device for communication, the method comprising:
    measuring, using an application layer protocol, a set of parameters for each of the available networks;
    determining an overall quality level for each of the available networks based on the parameters; and
    choosing a respective network based on the determined overall quality levels,
    wherein the determining is performed on an application-by-application basis,
    further including:
        repeating the measuring and determining periodically; and
        performing the choosing when an overall quality level of a previously selected network deteriorates by a predetermined level.

2. The method of claim 1, wherein the set of parameters are measured by communicating with each of a plurality of predetermined servers within the respective network.

3. The method of claim 2, wherein the application layer protocol is able to establish the communication with the servers without requiring an administrative privilege of the mobile device.

4. The method of claim 1, wherein the overall quality level for a respective network is determined at least by:
    assigning a specific quality level to each of the servers within the respective network based on a quality table which is specific to the respective network;
    selecting the overall quality level from all the specific quality levels.

5. The method of claim 4, wherein the overall quality level selected is the highest level out of all the specific quality levels.

6. The method of claim 1, further comprising:
    prior to the measuring, transmitting a pseudo message to wake up a radio which corresponds to the respective network.

7. The method of claim 1, wherein the measuring, determining, and choosing are performed automatically.

8. The method of claim 1, wherein the set of parameters includes a round-trip time (RTT) which comprises a time duration from transmitting a Synchronization (SYN) packet to receiving a Synchronization-Acknowledge (SYN-ACK) packet in a three-way transmission control protocol (TCP) handshake.

9. The method of claim 1, wherein the set of parameters includes packet loss (PL) percentage, wherein a packet is considered lost if a hypertext transfer protocol (HTTP) socket connect times out or if an input/output (I/O) exception occurs.

10. The method of claim 1, wherein the available network includes a cellular network.

11. The method of claim 1, wherein the available network includes a cellular network and a wireless fidelity (WiFi) network.

12. The method of claim 1, wherein the set of parameters are measured by a local proxy on the mobile device.

13. The method of claim 1, wherein the set of parameters are measured by a remote proxy remote from but coupled to the mobile device via a network.

14. The method of claim 13, wherein the local proxy and the remote proxy are parts of a distributed proxy and cache system which facilitates network and mobile traffic management.

15. A method for selecting a radio from a number of available radio modules on a mobile device for communication, the method comprising:
- measuring, using an application layer protocol, a set of parameters for available networks accessible by the number of available radio modules on the mobile device;
- determining an overall quality level for each of the available networks based on the parameters; and
- selecting a respective radio based on the determined overall quality levels,
- wherein the determining is performed on an application-by-application basis,
- further including:
  - repeating the measuring and determining periodically; and
  - performing the selecting when an overall quality level of a previously selected network deteriorates by a predetermined level.

16. The method of claim 15, wherein the set of parameters are measured by communicating, using a corresponding radio, with each of a plurality of predetermined servers within a respective network.

17. The method of claim 16, wherein the application layer protocol is able to establish communication with the servers without requiring an administrative privilege of the mobile device.

18. The method of claim 15, wherein the overall quality level for a respective network is determined at least by:
- assigning a specific quality level to each of the servers within the respective network based on a quality table which is specific to the respective network;
- selecting the overall quality level from all the specific quality levels, wherein the overall quality level selected is the highest level out of all the specific quality levels.

19. The method of claim 15, further comprising:
- prior to the measuring, transmitting a pseudo message to wake up a radio which corresponds to a respective network.

20. The method of claim 15, wherein the set of parameters are measured by a local proxy on the mobile device.

21. The method of claim 15, wherein the set of parameters are measured by a remote proxy remote from but coupled to the mobile device via a network.

22. The method of claim 16, wherein the local proxy and the remote proxy are parts of a distributed proxy and cache system which facilitates network and mobile traffic management.

23. A mobile device that is configured to select a network from a number of available networks at the mobile device for communication, the mobile device comprising:
- one or more processors; and
- memory circuitry coupled to the processors and having stored thereon instructions which, when executed by at least one of the processors, cause the mobile device to:
  - measure, using an application layer protocol, from a local proxy located on the mobile device, a set of parameters for each of the available networks;
  - determine, on an application by application basis, an overall quality level for each of the available networks based on the parameters; and
  - choose a respective network based on the determined overall quality levels, wherein the set of parameters are measured by communicating with servers within the respective network;
  - repeat the measuring of the set of parameters and the determining of an overall quality level periodically; and
  - perform the choosing of a respective network when an overall quality level of a previously selected network deteriorates by a predetermined level.

24. The mobile device of claim 23, wherein the application layer protocol is able to establish the communication with the servers without requiring an administrative privilege of the mobile device.

25. The mobile device of claim 23, wherein, to determine the overall quality level for a respective network, the device is further caused to:
- assign a specific quality level to each of the servers within the respective network based on a quality table which is specific to the respective network; and
- select the overall quality level from all the specific quality levels.

26. The mobile device of claim 23, wherein the device is further caused to:
- prior to the measuring, transmit a pseudo message to wake up a radio which corresponds to the respective network.

* * * * *